(12) United States Patent
Jeong

(10) Patent No.: US 8,059,516 B2
(45) Date of Patent: Nov. 15, 2011

(54) METHOD AND APPARATUS FOR RECORDING/REPRODUCING HOLOGRAPHIC INFORMATION

(75) Inventor: Taek-seong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 12/501,595

(22) Filed: Jul. 13, 2009

(65) Prior Publication Data

US 2010/0008206 A1    Jan. 14, 2010

(30) Foreign Application Priority Data

Jul. 14, 2008  (KR) ........................ 10-2008-0068348

(51) Int. Cl.
  *G11B 7/00*  (2006.01)
(52) U.S. Cl. ................... 369/112.24; 369/103
(58) Field of Classification Search .......................... None
See application file for complete search history.

(56) References Cited

U.S. PATENT DOCUMENTS

| | | | |
|---|---|---|---|
| 6,618,343 B1 | 9/2003 | Saitoh et al. | |
| 2004/0008603 A1 | 1/2004 | Saitoh et al. | |
| 2004/0257957 A1* | 12/2004 | Kim | 369/112.02 |
| 2007/0274185 A1 | 11/2007 | Kikukawa et al. | |
| 2008/0144146 A1 | 6/2008 | Boden et al. | |
| 2009/0073851 A1* | 3/2009 | Jeong et al. | 369/103 |

FOREIGN PATENT DOCUMENTS

| | | |
|---|---|---|
| JP | 2000-149308 | 5/2000 |
| KR | 10-0416350 | 1/2004 |
| KR | 10-2007-0113975 A | 11/2007 |
| WO | WO 2009/038273 A1 | 3/2009 |

OTHER PUBLICATIONS

Korean Decision of Grant issued on May 11, 2010, in corresponding Korean Application No. 10-2008-0068348 (5 pages).
Extended European Search Report issued on Sep. 23, 2009, in corresponding European Application No. 09165312.1 (7 pages).
Korean Office Action issued on Dec. 31, 2009, in Korean Application No. 10-2008-0068348 (3 pages, in Korean, no English translation).

* cited by examiner

*Primary Examiner* — Paul Huber
(74) *Attorney, Agent, or Firm* — NSIP Law

(57) ABSTRACT

Provided are a method and apparatus for recording/reproducing holographic information. The apparatus for recording/reproducing holographic information includes an optical pickup which irradiates light on a holographic information storage medium and receives irradiated light, wherein the optical pickup comprises a focusing optical system having a numerical aperture (NA) during recording that is lower than the NA during reproduction.

21 Claims, 19 Drawing Sheets

METHOD AND APPARATUS FOR RECORDING/REPRODUCING HOLOGRAPHIC INFORMATION

CROSS-REFERENCE TO RELATED APPLICATION

This application claims the benefit of Korean Patent Application No. 10-2008-0068348, filed Jul. 14, 2008 in the Korean Intellectual Property Office, the disclosure of which is incorporated herein by reference.

BACKGROUND OF THE INVENTION

1. Field of the Invention

The present invention relates to a method and apparatus for recording/reproducing holographic information.

2. Description of the Related Art

Technology for storing information by using a hologram has been widely used. In such technology, information is stored in an optical interference pattern shape in an inorganic crystal or a polymer material that is sensitive to light. Optical interference patterns are formed by using two coherent laser beams. In other words, interference patterns are formed when a reference light and a signal light having different paths interfere with each other, cause chemical or physical changes in a photosensitive information storage medium and are recorded thereon. A light that is similar to the reference light used to record information is irradiated on interference patterns recorded on the information storage medium so as to reproduce information from the recorded interference patterns. This causes diffraction due to the interference patterns and as such, the signal light is restored and information is reproduced.

Examples of technology for storing information by using holograms include a volume holography method by which information is recorded/reproduced in one page units by using volume holography and a micro-holography method by which information is recorded/reproduced in single bit units by using micro-holography. In the volume holography method, a large amount of information can be processed simultaneously. However, since an optical system must be very precisely adjusted, it is not easy to adopt the method in an apparatus for storing information for general consumers.

In the micro-holography method, two condensed light beams interfere with each other at a particular point of focus and thus form fine interference patterns, which are moved on a plane of an information storage medium, and a plurality of interference patterns are recorded on the information storage medium to form a plurality of recording layers. The recording layers are superimposed upon each other in a depth direction of the information storage medium to form a multi-layer structure so that information can be recorded three-dimensionally on the information storage medium.

In the micro-holography method, signal quality during reproduction is greatly affected by the diffraction efficiency of a recorded hologram. The diffraction efficiency of the recorded hologram is determined according to a difference in refractive indices of the information storage medium on which the hologram is recorded and which forms interference patterns, and according to the thickness of the recorded hologram. The diffraction efficiency of the recorded hologram is increased by an increase in the difference in refractive indices of the information storage medium and the thickness of the recorded hologram.

However, since the thickness of the recorded hologram is inversely proportional to the square of a numerical aperture (NA) of an optical pickup focusing optical system, when the NA is increased so as to increase a recording capacity, the thickness of the recorded hologram is lowered and as such, reflectivity is reduced by geometric progression. In other words, when the NA of the optical pickup focusing optical system is increased so as to increase the recording density, the diffraction efficiency of the recorded hologram is lowered and due to the lowered diffraction efficiency of a recording mark, it is difficult to obtain good signal quality during reproduction of the information storage medium. When the information storage medium having a threshold response is used so as to record a smaller mark than an optical minimization limit, signal quality due to the lowered diffraction efficiency of the recorded hologram may be further degraded.

SUMMARY OF THE INVENTION

Aspects of the present invention provide a method and an apparatus for recording/reproducing holographic information, whereby reflectivity of a recording mark in which information is recorded on a holographic information storage medium can be increased.

According to an aspect of the present invention, there is provided an apparatus for recording/reproducing holographic information that comprises an optical pickup which irradiates light on a holographic information storage medium and receives irradiated light, wherein the optical pickup comprises a focusing optical system having a numerical aperture (NA) during recording that is lower than the NA during reproduction According to an aspect of the invention, the focusing optical system satisfies an equation $1/4 \leq NA_1/NA_2 < 1$, when the NA during recording is $NA_1$ and the NA during reproduction is $NA_2$.

According to an aspect of the invention, the focusing optical system comprises an objective lens; and an aperture-adjustment element which changes a size of an aperture so as to adjust a diameter of the irradiated light that is incident on the objective lens.

According to an aspect of the invention, the focusing optical system comprises an objective lens; and a beam expander which adjusts a magnification of light so as to adjust a diameter of the irradiated light that is incident on the objective lens.

According to an aspect of the invention, the focusing optical system comprises an objective lens; and an active liquid crystal element which is activated to adjust a diameter of the irradiated light on the objective lens.

According to an aspect of the invention, the focusing optical system comprises an optical member for recording having the NA for recording; and an optical member for reproduction, having an NA larger than the NA of the optical member for recording, wherein the optical member for recording and the optical member for reproduction are selectively used during recording and during reproduction. The focusing optical system may further comprise an optical path conversion member which guides an optical path of a reference light during recording toward the optical member for recording and guides an optical path of the reference light during reproduction toward the optical member for reproduction.

According to an aspect of the invention, the optical member for recording is an objective lens for recording, and the optical member for reproduction is an objective lens for reproduction.

According to an aspect of the invention, the recording layer of the holographic information storage medium comprises a photo reactive material having a threshold response, and intensities of a signal light and a reference light that are irradiated during recording have larger values than threshold values of the photo reactive material in the center of spots of the signal light and the reference light.

According to an aspect of the invention, the optical pickup comprises first and second focusing optical systems which irradiate a signal light and a reference light on corresponding sides of the holographic information storage medium during recording. The NA of the second focusing optical system during recording is lower than the NA of the second focusing optical system during reproduction.

According to an aspect of the invention, the optical pickup irradiates signal light and reference light on a cross-section of the holographic information storage medium during recording.

According to an aspect of the invention, the apparatus for recording/reproducing holographic information further comprises first and second focus controlling units which control a depth of focus of each of a signal light and a reference light irradiated on the holographic information storage medium, wherein the first and second focus controlling units record information in a multi-layer structure.

According to another aspect of the present invention, there is provided a method of recording and reproducing holographic information that comprises recording information on a holographic information storage medium using a focusing optical system having a low numerical aperture (NA) during recording; and reading information from a holographic information storage medium using the focusing optical system having a high NA during reproduction.

According to an aspect of the invention, the NA of the focusing optical system is adjusted by adjusting the diameter of light that is incident on an objective lens of the focusing optical system.

According to an aspect of the invention, information is recorded on the holographic information storage medium having a recording layer formed of a photo reactive material having a threshold response, and the recorded information is read.

According to an aspect of the invention, information is recorded in a multi-layer structure within the recording layer of the holographic information storage medium.

According to an aspect of the invention, single bit information is recorded in an interference pattern shape.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
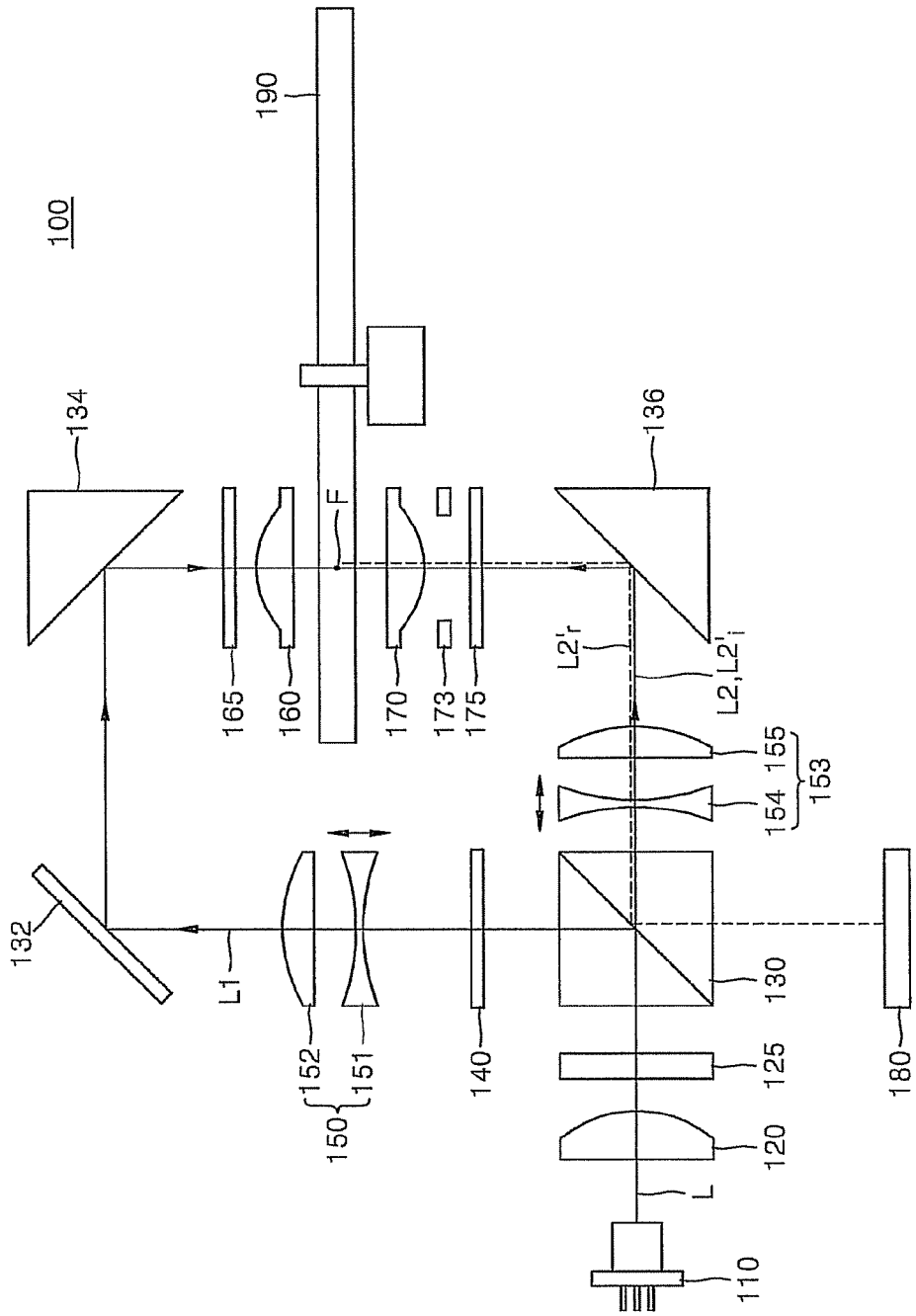
FIG. 1 is a schematic view of an apparatus for recording/reproducing holographic information according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic view of an apparatus for recording/reproducing holographic information according to an embodiment of the present invention. Referring to FIG. 1, the apparatus for recording/reproducing holographic information is an apparatus which records information on a holographic information storage medium 190 on which light is bilaterally irradiated, and reproduces recorded information from the holographic information storage medium 190. The apparatus of FIG. 1 comprises an optical pickup 100 which irradiates light on the holographic information storage medium 190 and receives irradiated light, and a circuit unit (not shown). While not shown, it is understood that the apparatus can include a controller which controls the recording and/or reproduction of data with respect to the holographic information storage medium 190 by the optical pickup 100.

The optical pickup 100 comprises a light source 110 which emits light, an optical path division element 130 which divides light emitted by the light source 110 into a signal light L1 and a reference light L2, a first objective lens 160 which focuses the signal light L1 on the holographic information storage medium 190, a second objective lens 170 which focuses the reference light L2 on the holographic information storage medium 190, an aperture-adjustment element 173 which adjusts the size of the aperture of the second objective lens 170, and a photodetector 180 which detects a reproduction light $L2'_r$ reflected from the holographic information storage medium 190. In addition, and while not required in all aspects, the optical pickup 100 further comprises first and second focus-adjustment units 150 and 153, which change focus positions of the signal light L1 and the reference light L2. Furthermore, and while not required in all aspects, the optical pickup 100 further comprises a collimating lens 120 which turns light emitted by the light source 110 into parallel beams, and first through third reflection members 132, 134, and 136 in which an optical path is appropriately changed. Furthermore, and while not required in all aspects, the optical pickup 100 further comprises a servo optical system (not shown) for performing a servo operation.

The light source 110 and the optical path division element 130 constitute a light source unit which emits light L for recording/reproduction. For example, a semiconductor laser diode of blue light may be used as the light source 110. However, the invention is not limited thereto.

The collimating lens 120 collimates a light L for recording/reproducing, which is emitted by the light source 110, into parallel beam. In the shown embodiment of the present invention, the collimating lens 120 is interposed between the light source 110 and a polarization conversion element 125. However, the present invention is not limited to this. For example, the collimating lens 120 may be disposed between the polarization conversion element 125 and the optical path division element 130 or on other optical paths.

The semiconductor laser diode used as the light source 110 mainly emits laser light having one polarization component. In this case, the polarization conversion element 125 may be disposed between the light source 110 and the optical path division element 130. For example, the polarization conversion element 125 may be a wave plate such as an active half wave plate or an active quarter wave plate. When the active half wave plate is used as the polarization conversion element 125, incident light having predetermined linear polarization passes the active half wave plate, the direction of polarization is rotated, and incident light having predetermined linear polarization may be converted into light having two perpendicular, linear polarization components (i.e., an S-polarization component and a P-polarization component). When the active quarter wave plate is used as the polarization conversion element 125, incident light having predetermined linear polarization is polarization converted into light having circular polarization. Such light having circular polarization may be decomposed into two perpendicular, linear polarization components. The S-polarization component and the P-polarization component of light that passes the polarization conversion element 125 correspond to the signal light L1 and the reference light L2, respectively, during recording.

While not required in all aspects, the polarization conversion element 125 may be an active element which performs a polarization conversion function during a recording operation and does not perform the polarization conversion function during a reproduction operation. When the active element is used as the polarization conversion element 125, all light emitted by the light source 110 during reproduction may be used as reproduction light.

The shown apparatus for recording/reproducing holographic information uses a micro-holography method by which interference patterns formed due to interference between the signal light L1 and the reference light L2 include single bit information on each focus point, and light emitted by the light source 110 may be modulated by 1 bit. Thus, both the signal light L1 and the reference light L2 include recording information and there is no essential difference in a recording operation of the signal light L1 and the reference light L2 and the terms may be interchanged. For convenience of explanation, light along the path of reproduction light $L2'_i$, that is incident on the holographic information storage medium 190, is used as a common optical path and is referred to as reference light L2.

The optical path division element 130 divides light that is emitted by the light source 110, and that has two perpendicular polarization components, into two parts and allows light of each polarization component to be irradiated on the holographic information storage medium 190 along a separate optical path. The optical path division element 130 may be a polarization beam splitter in which transmission and reflection of light is changed according to the direction of polarization. For example, the optical path division element 130 may transmit incident P-polarization light as the light that is maintained in its original state and may reflect incident S-polarization light. The optical path division element 130 divides light emitted by the light source 110 into reproduction light $L2'_i$ that is incident on the holographic information storage medium 190 during reproduction and reproduction light $L2'_r$ that is reflected from the holographic information storage medium 190 during reproduction.

The photodetector 180 is disposed at a side of the optical path division element 130 and detects the reproduction light $L2'_r$ that is divided by the optical path division element 130.

The signal light L1 and the reference light L2, which are divided by the optical path division element 130, are incident on the holographic information storage medium 190 via a focusing optical system. The holographic information storage medium 190, according to the present embodiment of the present invention, is a transmission type medium on which the signal light L1 and the reference light L2 are bilaterally irradiated. Thus, the focusing optical system may include a first focusing optical system which focuses the signal light L1 and a second focusing optical system which focuses the reference light L2. A shutter 140, the first focus-adjustment unit 150, the first and second reflection members 132 and 134, a first quarter wave plate 165, and the first objective lens 160 constitute the first focusing optical system which focuses the signal light L1, and the second focus-adjustment unit 153, the third reflection member 136, a second quarter wave plate 175, an aperture-adjustment element 173, and the second objective lens 170 constitute the second focusing optical system which focuses the reference light L2.

The first through third reflection members 132, 134, and 136 may be optical members in which an optical path is folded so that optical elements can be appropriately disposed. The first through third reflection members 132, 134, and 136 may be mirrors or total reflection prisms and the like, and different numbers of such elements can be used in other aspects of the invention.

The shutter 140 is an optical member which transmits/intercepts incident light. The shutter 140 may transmit the signal light L1 as the signal light L1 that is maintained in its original state, during a recording operation and may intercept light that is incident on the holographic information storage medium 190 or reflected from the holographic information storage medium 190 during a reproduction operation.

The first and second focus-adjustment units 150 and 153 change focus positions of the signal light L1 and the reference light L2 within the holographic information storage medium 190. For example, the first focus-adjustment unit 150 comprises first and second relay lenses 151 and 152, and the first relay lens 151 may be constituted in such a way that it is mechanically driven to be moved in parallel along an optical axis and thus, the focus position of the signal light L1 is changed. In addition, the second focus-adjustment unit 153 comprises third and fourth relay lenses 154 and 155, and the third relay lens 154 may be constituted in such a way that it is mechanically driven to be moved in parallel along an optical axis and thus, the focus position of the reference light L2 is changed. In this way, the focus positions of the signal light L1 and the reference light L2 are changed by using the first and second focus-adjustment units 150 and 153 so that holographic interference patterns (i.e., recording marks), can be recorded in a multi-layer shape in the holographic information storage medium 190.

The first and second quarter wave plates 165 and 175 convert linear polarization of light that is incident on the holographic information storage medium 190 into circular polarization and convert circular polarization of light that is reflected from the holographic information storage medium 190 into linear polarization.

The aperture-adjustment element 173 is an optical member which actively adjusts the diameter of passing light. For example, the aperture-adjustment element 173 may narrow the size of an aperture during a recording operation and may widen the size of the aperture during a reproduction operation. The aperture-adjustment element 173 may have a construction in which two apertures may be selectively replaced with a single aperture during recording and during reproduction or may be the iris of a camera lens. The aperture of the aperture-adjustment element 173 may be circular. In the present embodiment of the present invention, the aperture-adjustment element 173 may be disposed on an optical path of the reference light L2 but may also be disposed on an optical path of the signal light L1. The detailed description of the operation of the aperture-adjustment element 173 will be described later.

The first and second objective lenses 160 and 170 are optical members which focus the signal light L1 and the reference light L2, respectively. A numerical aperture (NA) of the second objective lens 170 during recording may be made smaller than the NA of the second objective lens 170 during reproduction, as will be described later. In addition, a NA of the first objective lens 160 used only during recording may be made smaller than the NA of the second objective lens 170 used during recording. The first objective lens 160 may be more easily manufactured as the required NA thereof is reduced. Furthermore, in the holographic information storage medium 190 used in the apparatus for recording/reproducing holographic information according to the shown embodiment of the present invention, a recording layer 192 (see FIGS. 3A and 3B) is formed of a photo reactive material having a threshold response. In this case, when the optical design of the first objective lens 160 is performed, a wide acceptable tolerance for NA can be obtained.

The operation of the apparatus for recording/reproducing holographic information according to the present embodiment of the present invention will now be described. First, a recording operation will be described. The light source 110 emits light L that is modulated according to information to be recorded. The emitted light L is converted into light having an S-polarization component and a P-polarization component via the polarization conversion element 125 and is divided into P-polarization light and S-polarization light by the optical path division element 130. For convenience of explanation, the S-polarization light is reflected from the optical path division element 130 and becomes the signal light L1, and the P-polarization light is transmitted by the optical path division element 130 and becomes the reference light L2. The signal light L1 is divided from the emitted light L by the optical path division element 130 and is focused on a first side of the holographic information storage medium 190 by the first objective lens 160 via the shutter 140, the first focus-adjustment unit 150, and the first and second reflection members 132 and 134 and is incident on a first side of the holographic information storage medium 190. The reference light L2 is divided from the emitted light L by the optical path division element 130 and is focused by the second objective lens 170 via the second focus-adjustment unit 153, the third reflection member 136, the second quarter wave plate 175, and the aperture-adjustment element 173 and is incident on a second side of the holographic information storage medium 190. The signal light L1 and the reference light L2 that are incident on the first and second sides of the holographic information storage medium 190 form a focus F within the holographic information storage medium 190 and a recording mark including single bit information is recorded at a position in which the focus F is formed due to holographic interference patterns. The foci of the focused signal light L1 and reference light L2 may be changed by the first and second focus-adjustment units 150 and 153, and a plurality of different interference patterns are formed in different focus positions in the depth direction of the recording layer 192 (see FIGS. 3A and 3B) so that multi-layer recording can be performed.

Next, a reproduction operation will be described. The light source 110 emits unmodulated light L. When the light source 110 emits only light of one linear polarization or the polarization conversion element 125 is an active element, light that passes through the polarization conversion element 125 is linear-polarized light in one direction. For convenience of explanation, polarization of light that passes through the polarization conversion element 125 is referred to as P-polarization. P-polarization light that is transmitted by the optical path division element 130 (i.e. reproduction light $L2'_i$), is focused on the second objective lens 170 via the second focus-adjustment unit 153, the third reflection member 136, the second quarter wave plate 175, and the aperture-adjustment element 173 and is incident on the holographic information storage medium 190. The reproduction light $L2'_i$ is reflected from the recording layer 192 (see FIGS. 3A and 3B) of the holographic information storage medium 190 in which information is recorded, and the reflected reproduction light $L2'_r$ is incident on the optical path division element 130 via the second objective lens 170, the aperture-adjustment element 173, the second quarter wave plate 175, the third reflection member 136, and the second focus-adjustment unit 153. In this case, the polarization direction of the reproduction light $L2'_r$ that is reflected from the holographic information storage medium 190 is changed and thus is reflected from the optical path division element 130 and is incident on the photodetector 180.

Figure 2A:
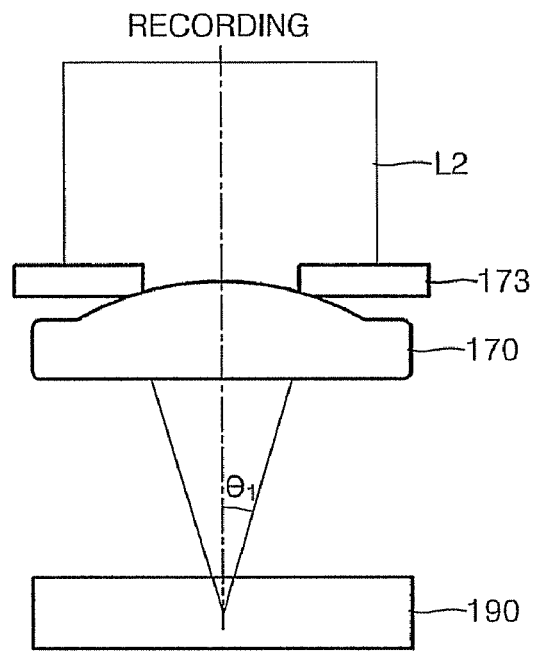
FIGS. 2A and 2B illustrate the operation of an aperture-adjustment element during recording and during reproduction, respectively, according to an aspect of the invention.
Figure 2B:
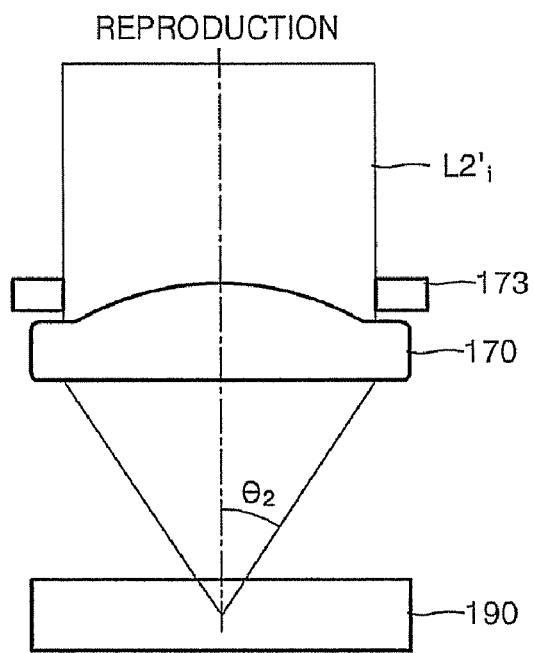

The size of the aperture of the aperture-adjustment element 173 is changed during recording and during reproduction. FIGS. 2A and 2B illustrate the operation of the aperture-adjustment element 173 during recording and during reproduction, respectively, according to an aspect of the invention. Referring to FIG. 2A, the size of the aperture of the aperture-adjustment element 173 during recording is made small so that the diameter of the reference light L2 that is incident on the second objective lens 170 is reduced and an angle $\theta_1$ of converged light is also reduced. Referring to FIG. 2B, the size of the aperture of the aperture-adjustment element 173 during reproduction is made large so that the diameter of the reproduction light $L2'_i$ that is incident on the second objective lens 170 is increased and an angle $\theta_2$ of converged light is also increased.

The NA of the second objective lens 170 is in proportion to the sine value of the angles $\theta_1$ and $\theta_2$ of the converged light. The angles $\theta_1$ and $\theta_2$ of the converged light are angles formed between the optical axis of the second objective lens 170 and the outermost light among converged light that is converged at a point of focus by the second objective lens 170. The angles $\theta_1$ and $\theta_2$ of the converged light are in proportion to the diameter of light that is incident on the second objective lens 170 when the focus positions of the signal light L1 and the reference light L2 are the same. Since the diameter of light that is incident on the second objective lens 170 may be adjusted by the aperture-adjustment element 173, the NA of the second objective lens 170 may be changed by the aperture-adjustment element 173. In the shown embodiment of the present invention, the size of the aperture of the aperture-adjustment element 173 during reproduction is made larger than the size of the aperture of the aperture-adjustment element 173 during recording so that the NA of the second objective lens 170 during reproduction can be made larger than the NA of the second objective lens 170 during recording. The first objective lens 160 is substantially used during recording and thus, the NA of the first objective lens 160 may be designed based on the NA of the second objective lens 170 during recording. In the shown embodiment of the present invention, the aperture-adjustment element 173 is disposed on the optical path of the reference light L2. However, the aperture-adjustment element 173 may also be disposed on the optical path of the signal light L1. Although the aperture-adjustment element 173 is disposed on the optical path of the signal light L1, the depth of focus of a recording mark M formed during recording is substantially the same as that of the case where the aperture-adjustment element 173 is disposed on the optical path of the reference light L2. As a result, the diffraction efficiency of the recording mark M is increased like the case where the aperture-adjustment element 173 is disposed on the optical path of the reference light L2.

Figure 3A:
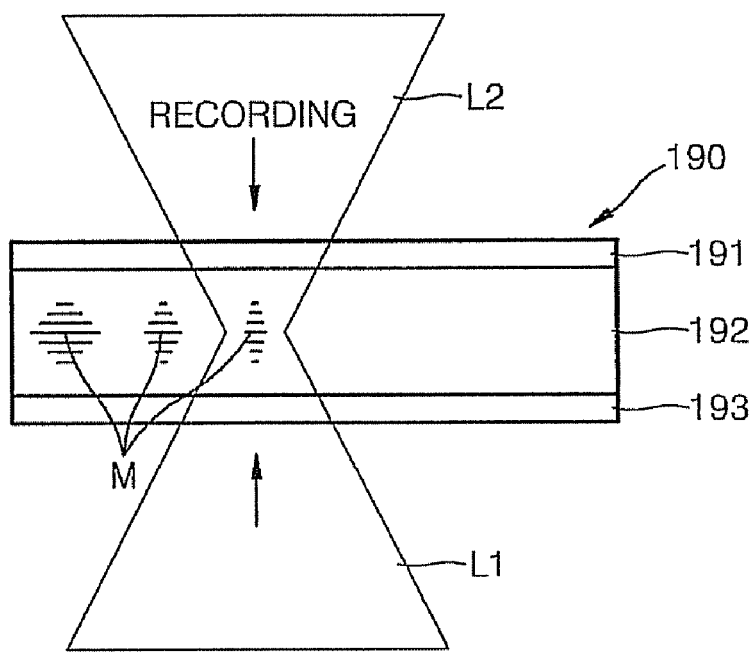
FIGS. 3A and 3B illustrate a case where a recording mark is formed on a holographic information storage medium used in the apparatus of FIG. 1 during recording and during reproduction, respectively, according to an aspect of the invention.
Figure 3B:
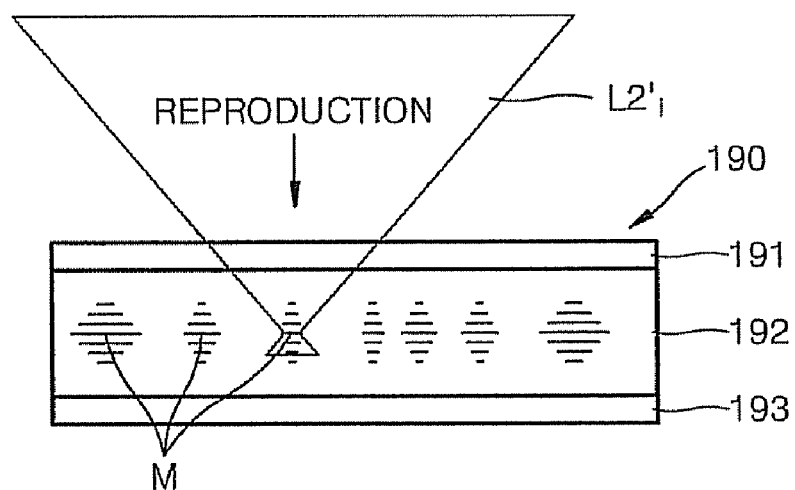

FIGS. 3A and 3B illustrate the case where the recording mark M is formed on the holographic information storage medium 190 during recording and during reproduction, respectively. The holographic information storage medium 190, according to the shown embodiment of the present invention, is a double-sided irradiation type medium comprising a recording layer 192 formed of a photo reactive material in which hologram interference patterns may be recorded, and cover layers 191 and 193 which support and protect the recording layer 192. A servo layer (not shown) in which servo information is included may be formed between the cover layers 191 and 193 and the recording layer 192.

Referring to FIG. 3A, hologram interference patterns (i.e., the recording mark M), are formed on the recording layer 192 of the holographic information storage medium 190 due to interference of the signal light L1 and the reference light L2. Referring to FIG. 3B, the reproduction light $L2'_i$ is irradiated on the recording layer 192 of the holographic information storage medium 190 during reproduction so that the recorded recording mark M can be read.

Signal quality during reproduction is related to the diffraction efficiency of the recording mark M formed on the recording layer (192 of FIG. 3A) of the holographic information storage medium 190. As the diffraction efficiency of the recording mark M is increased, signal quality during reproduction is improved. When the diffraction efficiency of the recording mark M is low, like in a photo reactive material used for the recording layer 192, the diffraction efficiency of the recording mark M can be approximately obtained by using equation 1.

$$\eta = \left(\frac{\pi \Delta n d}{\lambda}\right)^2 \quad (1)$$

where $\eta$ is diffraction efficiency, $\Delta n$ is a refractive index difference of hologram interference patterns, d is the thickness of recorded hologram, and $\lambda$ is the wavelength of the light. In a micro-hologram, d is a value which corresponds to about twice the depth of focus of recorded light. The depth of focus is given by $\lambda/NA^2$ in the case of a conventional photo reactive material having no threshold response. Thus, the diffraction efficiency of a hologram (i.e., reflectivity), is in proportion to $1/NA^4$.

Figure 4:
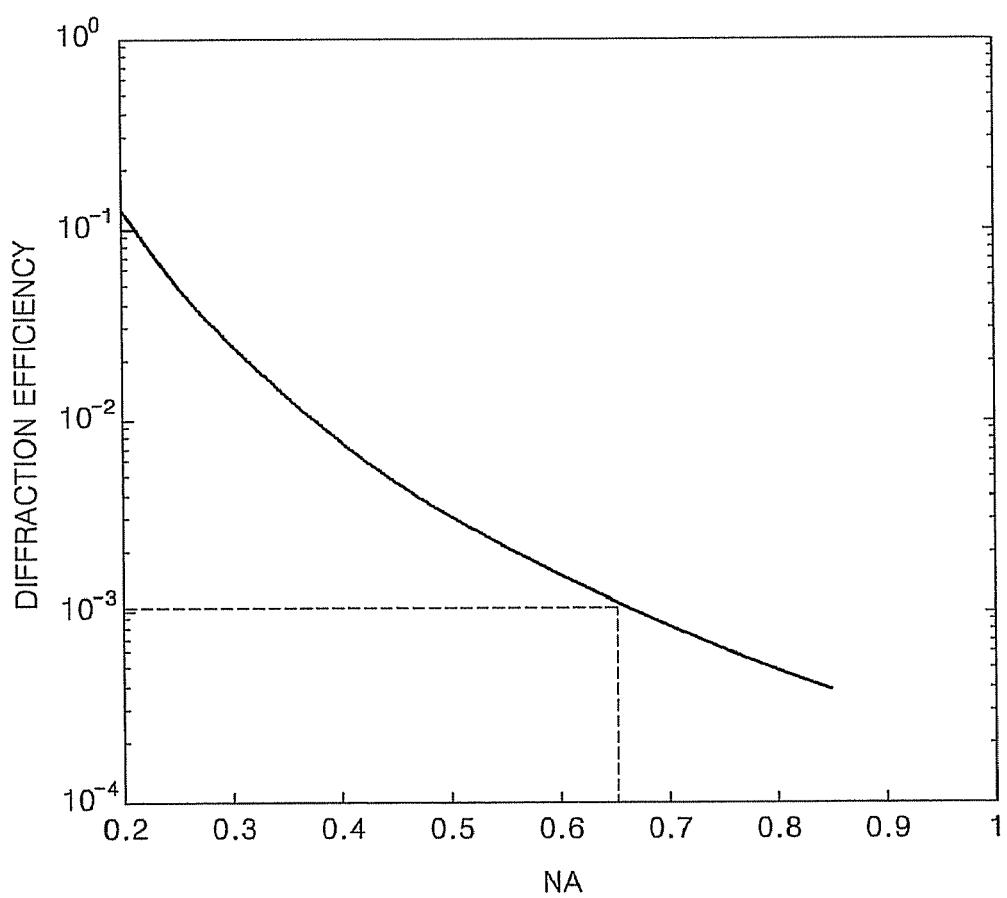
FIG. 4 is a graph of numerical aperture (NA) versus the diffraction efficiency of a hologram according to an aspect of the invention.

FIG. 4 is a graph of NA versus the diffraction efficiency of a hologram. Referring to FIG. 4, when the NA is increased so as to increase the cross-section recording capacity of the holographic information storage medium 190, reflectivity is reduced by geometric progression. Thus, the problem of the low diffraction efficiency of a hologram resulting from low reflectivity, which occurs in the conventional method for recording/reproducing hologram information, may be made worse.

Accordingly, in the shown embodiments of the present invention, the NA of an optical pickup focusing optical system during recording is made smaller than the NA of an optical pickup focusing optical system during reproduction. Therefore, a lowering of diffraction efficiency is prevented by forming the recording layer 192 of the holographic information storage medium 190 by using a photo reactive material having a threshold response and maintaining a recording density.

The photo reactive material having a threshold response is a material having a nonlinear characteristic which responds to light having a predetermined light intensity and does not respond to light having a light intensity below the predetermined light intensity. The photo reactive material having a threshold response is well-known to one of ordinary skill in the art and thus, a detailed description thereof will be omitted here.

Figure 5:
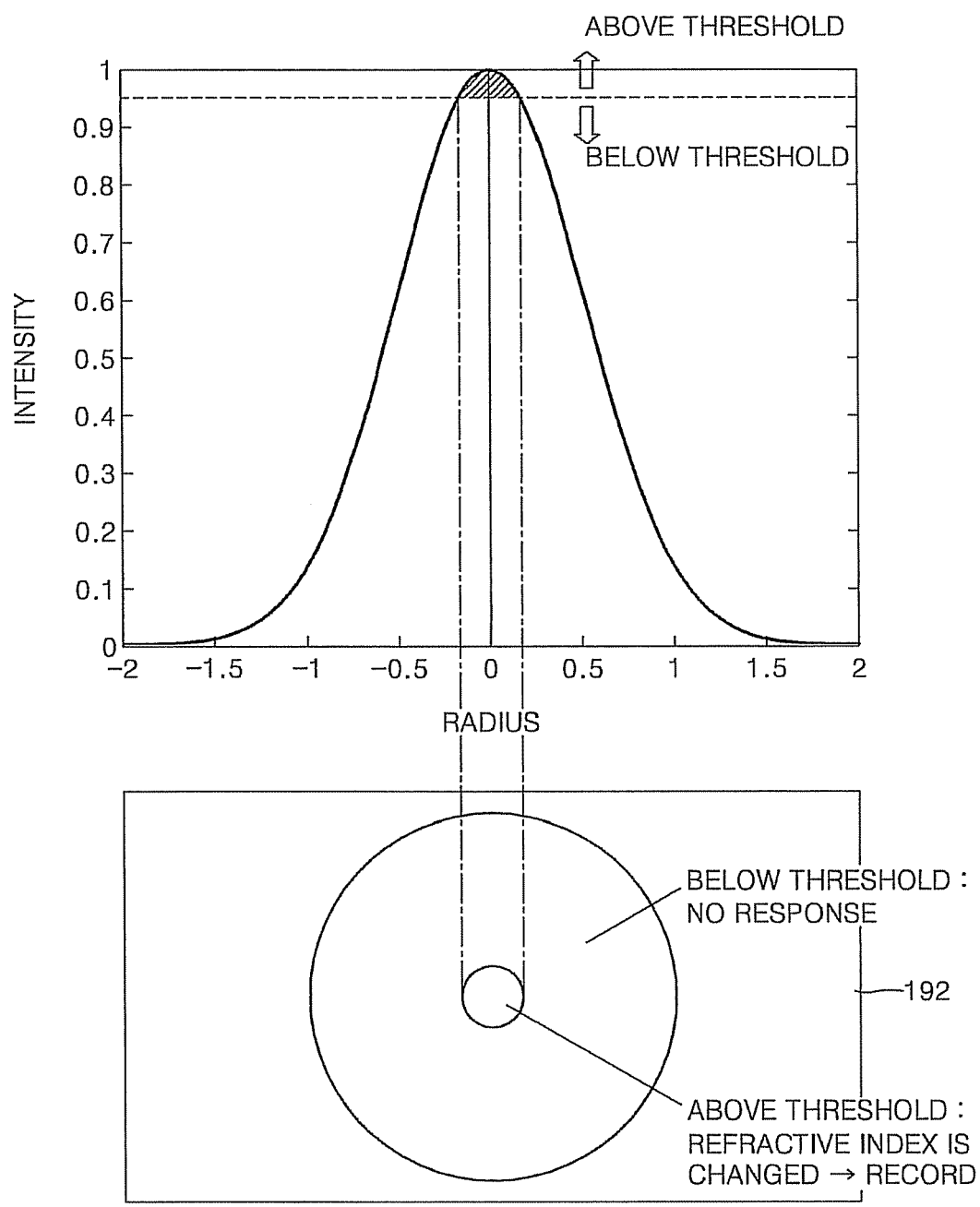
FIG. 5 is a graph of radius versus intensity of a recording mark with respect to a photo reactive material having a threshold response according to an aspect of the invention.

FIG. 5 is a graph of radius versus intensity of a recording mark with respect to a photo reactive material having a threshold response. Referring to FIG. 5, generally, light that is incident at a point of focus of the recording layer 192 has a Gaussian distribution light intensity profile, which is a distribution in which light intensity is high in the center of a spot of the light and light intensity is low on a circumferential portion of the spot. In this case, when only the center of the spot has a high light intensity that satisfies a threshold value required by the photo reactive material, only the center spot will be conducive to forming a recording mark. On the other hand, a reproduction operation is performed regardless of the threshold response. In other words, in the reproduction operation, reproduction light $L2'_i$ that is irradiated on the holographic information storage medium 190 has an intensity below a predetermined light intensity required for a threshold response. In this regard, considering a diffraction limit of the irradiated reproduction light $L2'_i$, the size of the recording mark formed during recording may be the same as or larger than the diameter of a spot having a diffraction limit (i.e., $\lambda/2NA$).

As described above, in the case of the photo reactive material having a threshold response, only the center of the spot having a larger light intensity than a predetermined threshold value is conducive to forming the recording mark. Thus, the size of the spot of irradiated signal light or reference light during recording may be made larger than the size of the recording mark to be recorded. In other words, the size of the spot of light irradiated during recording may be made larger than the size of a spot of light irradiated during reproduction. The diffraction limit of an objective lens which determines the size of the spot of light is inversely proportion to the square of the thickness d of a hologram, and the thickness d of a hologram is a value which corresponds to about twice the depth of focus of light recorded. However, when the photo reactive material is used as in the present embodiment of the present invention, the depth of focus d of the recording mark M is proportional to $D/NA_1$. In this case, D is the diameter of the recording mark M, and $NA_1$ is an NA of the second objective lens 170 during recording. The diameter D of the recording mark M is set regardless of the NA of the second objective lens 170 during recording and is set in consideration of the diffraction limit of reproduction light. In other words, the diameter D of the recording mark M is in proportion to $1/NA_2$. In this case, $NA_2$ is the NA of the second objective lens 170 during reproduction. As a result, the depth of focus d of the recording mark M can be obtained by using equation 2.

$$d \propto \frac{D}{NA_1} \propto \frac{1}{NA_1 \times NA_2} \propto \frac{NA_2}{NA_1} \times \left(\frac{1}{NA_2}\right)^2 \quad (2)$$

Thus, according to the present embodiment of the present invention, when equation 2 is substituted for equation 1, the diffraction limit of the holographic information storage medium used in the apparatus for recording/reproducing holographic information can be obtained by using equation 3.

$$\eta \propto \left(\frac{NA_2}{NA_1}\right)^2 \times \left(\frac{1}{NA_2}\right)^4 \quad (3)$$

Referring to equation 3, the diffraction limit of the holographic information storage medium according to the preset embodiment of the present invention is in proportion to the square of a reciprocal number of the NA of the second objective lens 170, i.e., a focusing optical system during recording. Equation 3 shows that diffraction efficiency increases as the NA of the focusing optical system is reduced during a recording operation of the focusing optical system. However, when the recording mark M (i.e. a hologram), is recorded larger than the depth of focus of reproduction light, the effect of an increase in diffraction efficiency is lowered. Thus, it is inefficient to set the NA of the focusing optical system to be very low during recording, and it will be efficient to set the NA of the focusing optical system during recording to be the same as or ¼ larger than the NA of the focusing optical system during reproduction or to be smaller than the NA of the focusing optical system during reproduction. In other words, according to embodiments of the present invention, it is efficient that the focusing optical system satisfies equation 4 when the NA of the focusing optical system during recording is $NA_1$ and the NA of the focusing optical system during reproduction is $NA_2$.

$$¼ \leq NA_1/NA_2 < 1 \quad (4)$$

The NA of the focusing optical system during recording is related to the depth of focus of the recording mark M. This may be slightly changed according to the threshold value of the photo reactive material used to form the recording layer 192 of the holographic information storage medium 190 or a light intensity of irradiated light.

Figure 6:
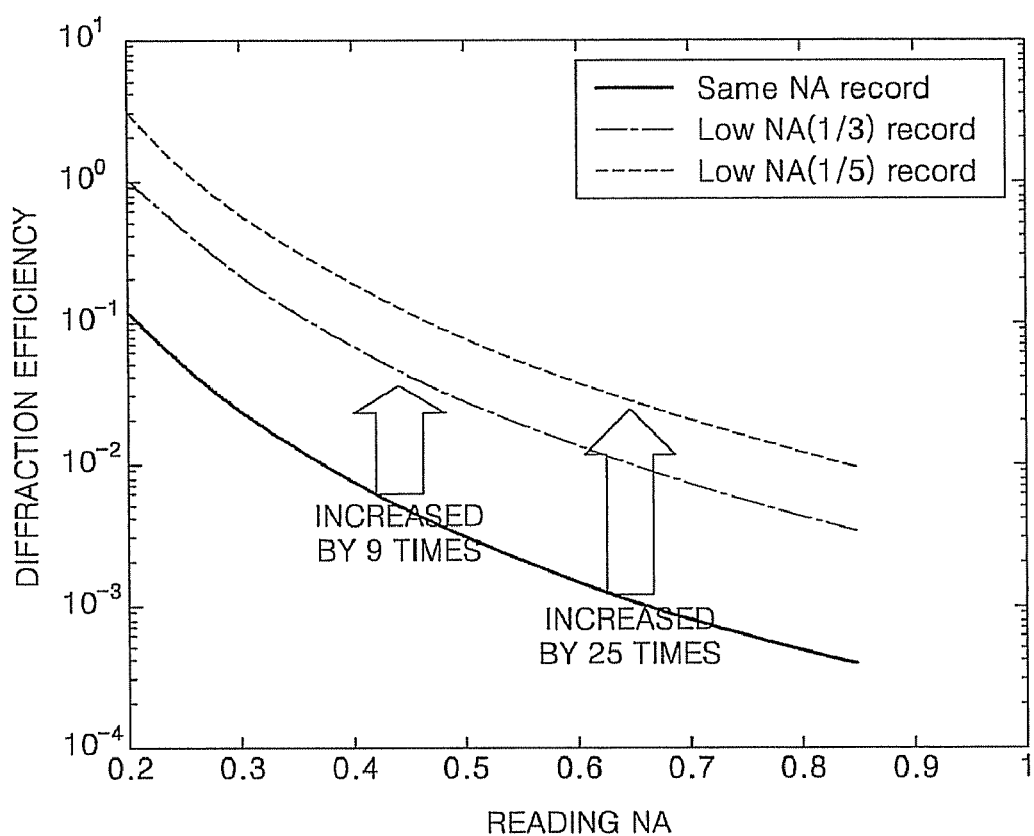
FIG. 6 illustrates an improvement in the diffraction efficiency of the apparatus of FIG. 1 according to an aspect of the invention.

FIG. 6 illustrates an improvement in the diffraction efficiency of the apparatus of FIG. 1. Referring to FIG. 6, the diffraction efficiency of the apparatus of FIG. 1 is increased by 9 times when the NA of the second objective lens 170 during recording is ⅓ of the NA of the second objective lens 170 during reproduction, and the diffraction efficiency of FIG. 1 is increased by 25 times when the NA of the second objective lens 170 during recording is ⅕ of the NA of the second objective lens 170 during reproduction. Such an increase in diffraction efficiency directly means an increase in reflectivity of the recording mark M. Thus, in the embodiments of the present invention, the NA of the focusing optical system may be the same as the NA of the focusing optical system of the conventional apparatus for recording/reproducing holographic information. In this case, an expected recording density in the conventional apparatus for recording/reproducing holographic information is maintained, and reflectivity in the recording mark M can be increased.

Figure 7:
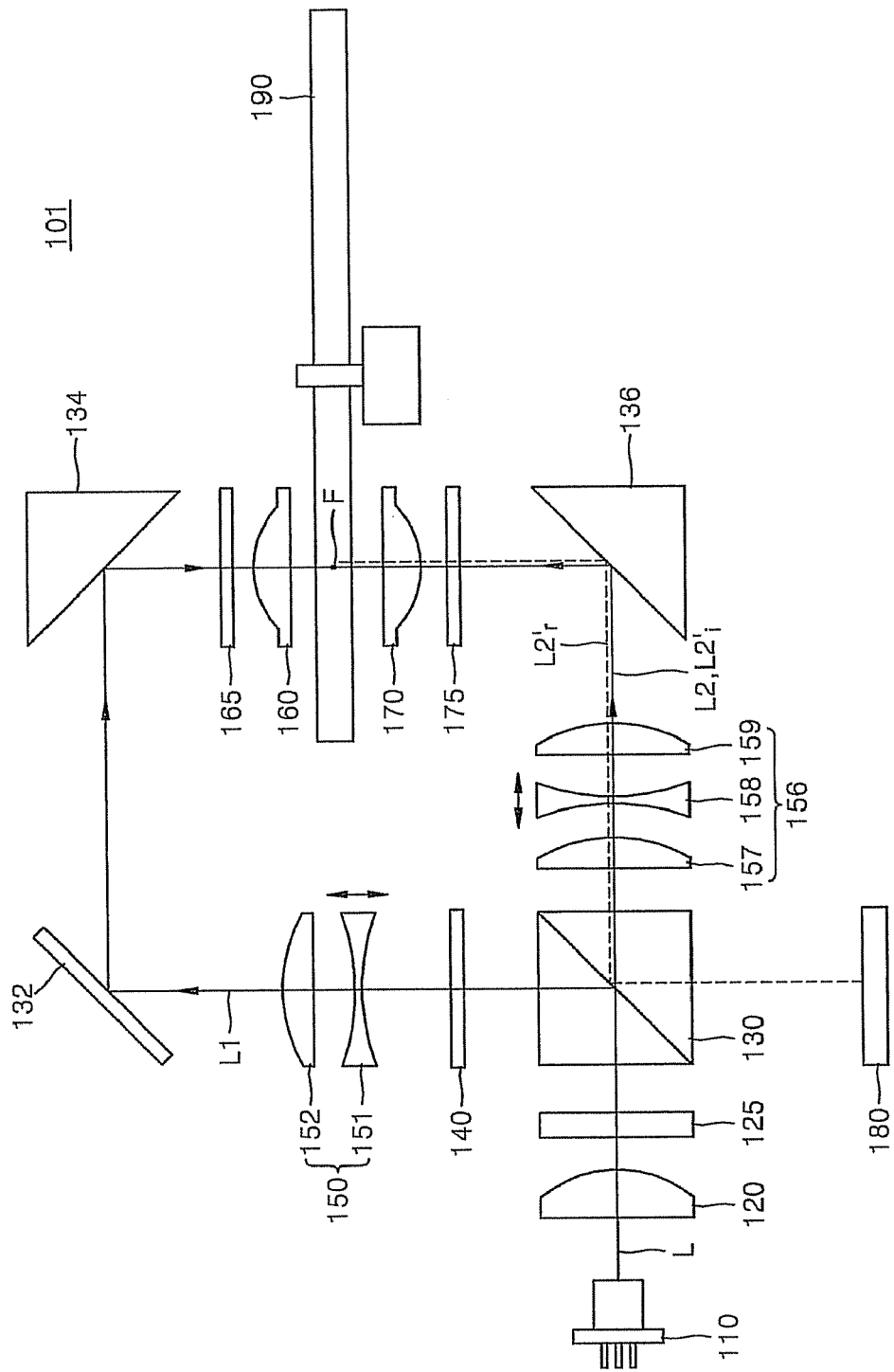
FIG. 7 is a schematic view of an apparatus for recording/reproducing holographic information according to an embodiment of the present invention.
Figure 8A:
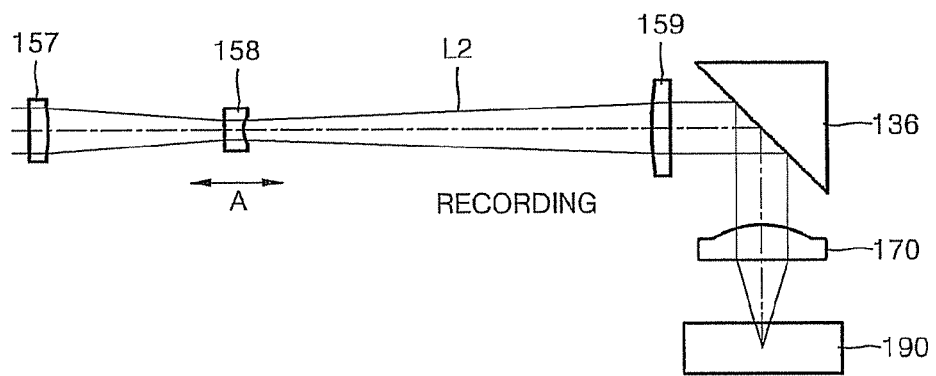
FIGS. 8A and 8B illustrate the operation of a beam expander during recording and during reproduction, respectively, of the apparatus of FIG. 7 according to an aspect of the invention.
Figure 8B:
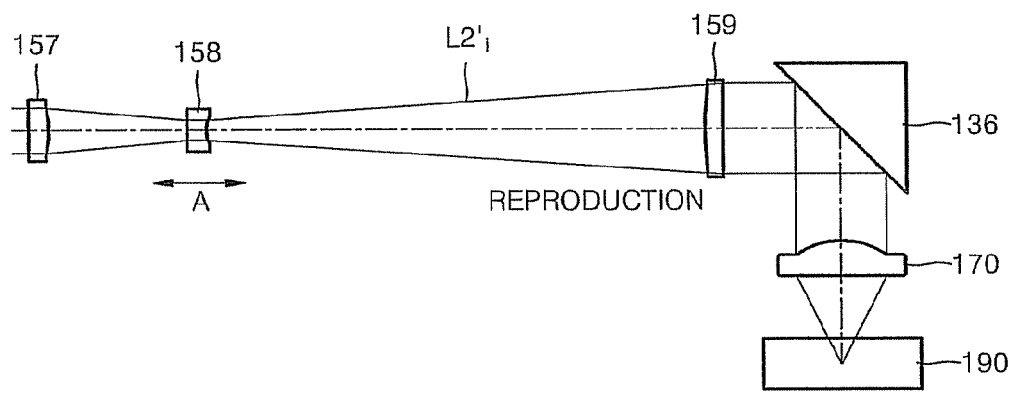

FIG. 7 is a schematic view of an apparatus for recording/reproducing holographic information according to another embodiment of the present invention, and FIGS. 8A and 8B illustrate the operation of the apparatus of FIG. 7. Referring to FIG. 7, the apparatus for recording/reproducing holographic information is an apparatus which records information on a holographic information storage medium 190 and reproduces recorded information. The other elements of the optical construction of the apparatus of FIG. 7, except for a beam expander 156 which is a unit for adjusting the NA of a focusing optical system, are substantially the same as those of FIGS. 1 through 6. Like reference numerals in FIGS. 1 through 6 denote like elements and thus, a description thereof will be omitted here.

An optical pickup 101, according to the shown embodiment, comprises a beam expander 156 instead of the aperture-adjustment element (173 of FIG. 1), so as to adjust the NA of a second objective lens 170. The beam expander 156 comprises a plurality of relay lenses 157, 158, and 159. The beam expander 156 may adjust a magnification of reference light L2 or reproduction light $L2'_i$, thereby adjusting the diameter of reference light L2 or reproduction light $L2'_i$. Therefore, the beam expander 156 may control the focus position of reference light L2 or reproduction light $L2'_i$ by replacing the second focus-adjustment unit 153 of FIGS. 1 through 6. The first objective lens 160 is substantially used for recording. Thus, the NA of the first objective lens 160 may be designed to be the same as the NA of the second objective lens 170 during recording.

Referring to FIGS. 8A and 8B, the beam expander 156 comprises first through third relay lenses 157, 158, and 159 and may adjust the diameter of light that passes the beam expander 156 by changing the position of the second relay lens 158 in a direction A. The beam expander 156 may make the diameter of light passing during recording smaller than the diameter of light passing during reproduction and may make the diameter of light passing during reproduction larger than the diameter of light passing during recording. As described above, when the diameter of light that is incident on the second objective lens 170 is changed, the NA of the second objective lens 170 is changed. In other words, the NA of the second objective lens 170, during recording, may be made smaller than the NA of the second objective lens 170 during reproduction. In this case, the diffraction efficiency of the apparatus is increased, and an improvement in signal quality during reproduction can be expected, as described above with reference to FIG. 6.

Figure 9:
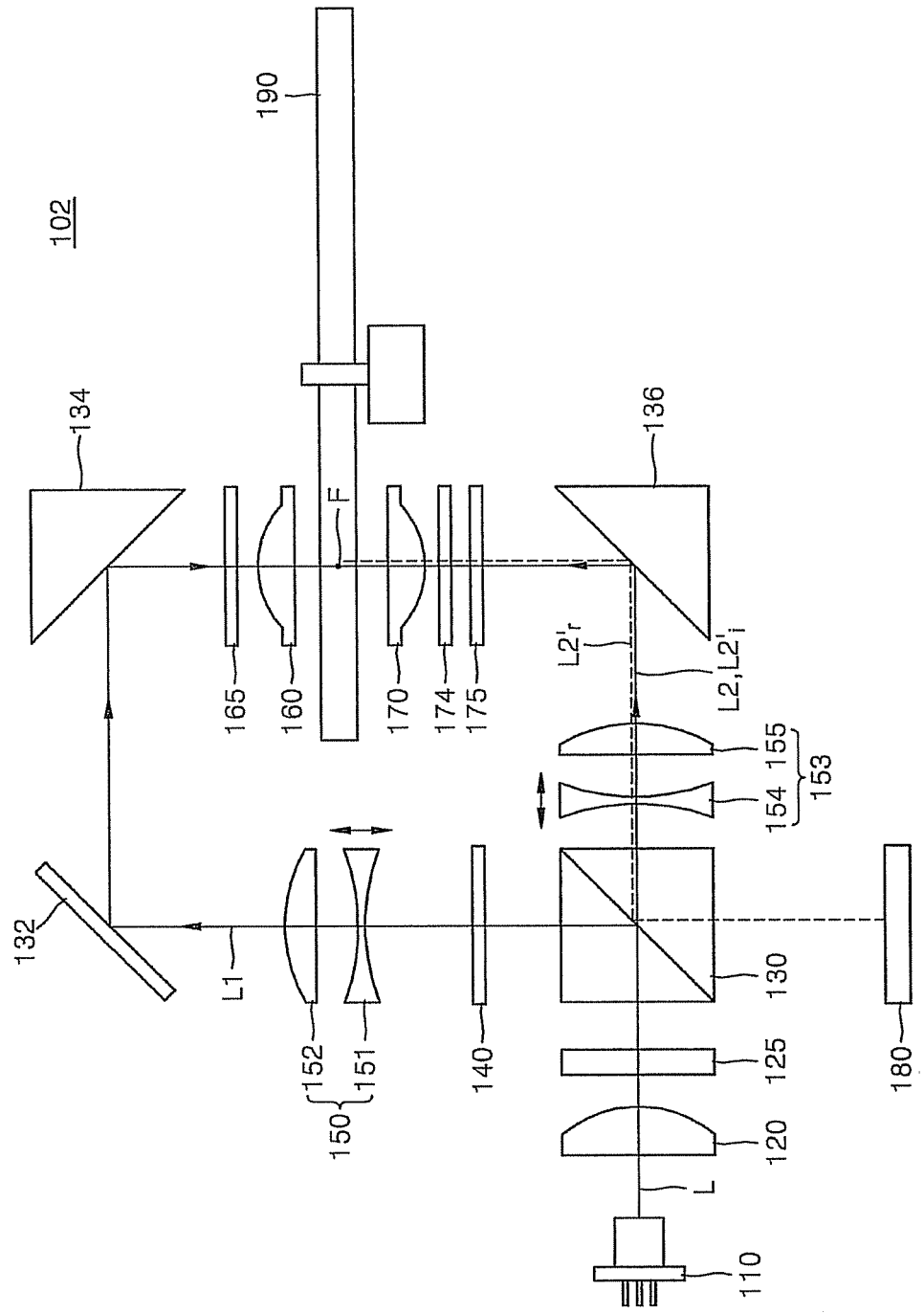
FIG. 9 is a schematic view of an apparatus for recording/reproducing holographic information according to an embodiment of the present invention.
Figure 10A:
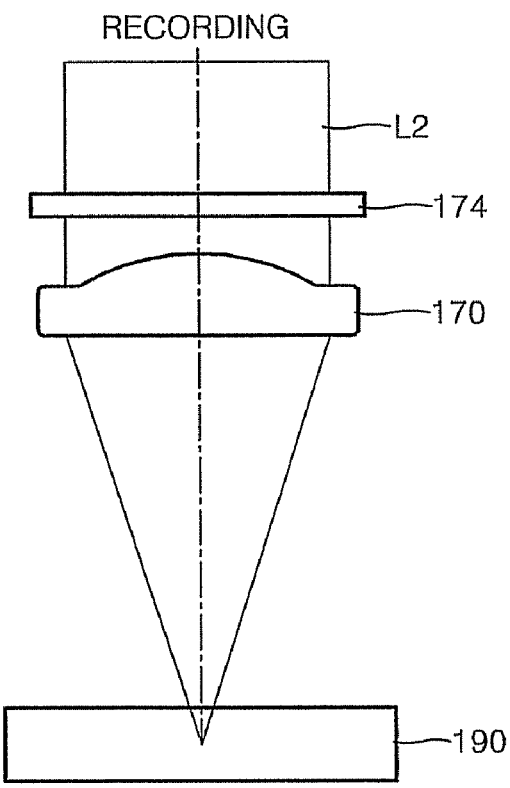
FIGS. 10A and 10B illustrate the operation of a liquid crystal lens during recording and during reproduction, respectively, according to an aspect of the invention.
Figure 10B:
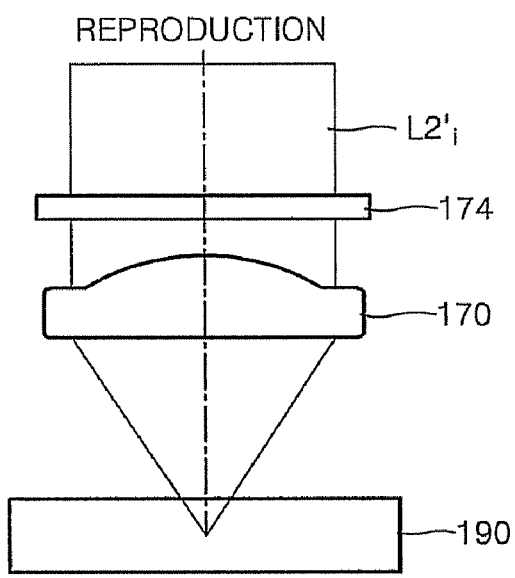

FIG. 9 is a schematic view of an apparatus for recording/reproducing holographic information according to an embodiment of the present invention, and FIGS. 10A and 10B illustrate the operation of a liquid crystal lens during recording and during reproduction, respectively. Referring to FIG. 9, the apparatus for recording/reproducing holographic information is an apparatus which records information on a holographic information storage medium 190 and reproduces recorded information. The other elements of the optical construction of the apparatus of FIG. 9, except for a liquid crystal lens 174 which is a unit for adjusting the NA of a focusing optical system, are substantially the same as those of FIGS. 1 through 6. Like reference numerals in FIGS. 1 through 6 denote like elements and thus, a description thereof will be omitted here.

An optical pickup 102, according to the shown embodiment of the present invention, comprises the liquid crystal lens 174 instead of the aperture-adjustment element 173 of FIG. 1 or the beam expander 156 of FIG. 7, so as to adjust the NA of a second objective lens 170. The liquid crystal lens 174 may comprise a liquid crystal layer in which a pair of transparent electrodes are interposed, and the refractive index of the liquid crystal lens 174 is changed when liquid crystal molecules are aligned in the liquid crystal layer when voltages are applied to the electrodes. The liquid crystal lens 174 may be adjacent to the second objective lens 170 and may be interposed between a second quarter wave plate 175 and the second objective lens 170, for example. The refractive index of the liquid crystal lens 174 is changed according to externally applied voltages. Thus, the degree of convergence/divergence of light that is incident on the second objective lens 175 via the liquid crystal lens 174 may be changed, and the diameter of light that is incident on the second objective lens 175 may be changed. The NA of the second objective lens 170 may be adjusted by the liquid crystal lens 174.

Referring to FIGS. 10A and 10B, the NA of the second objective lens 170 during recording may be made smaller than the NA of the second objective lens 170 during reproduction by using the liquid crystal lens 174. Thus, the NA of the second objective lens 170 during recording is made smaller than the NA of the second objective lens 170 during reproduction so that the recording mark M recorded in the holographic information storage medium 190, i.e., the diffraction efficiency of the hologram, is increased, and an improvement in signal quality during reproduction can be expected.

Figure 11:
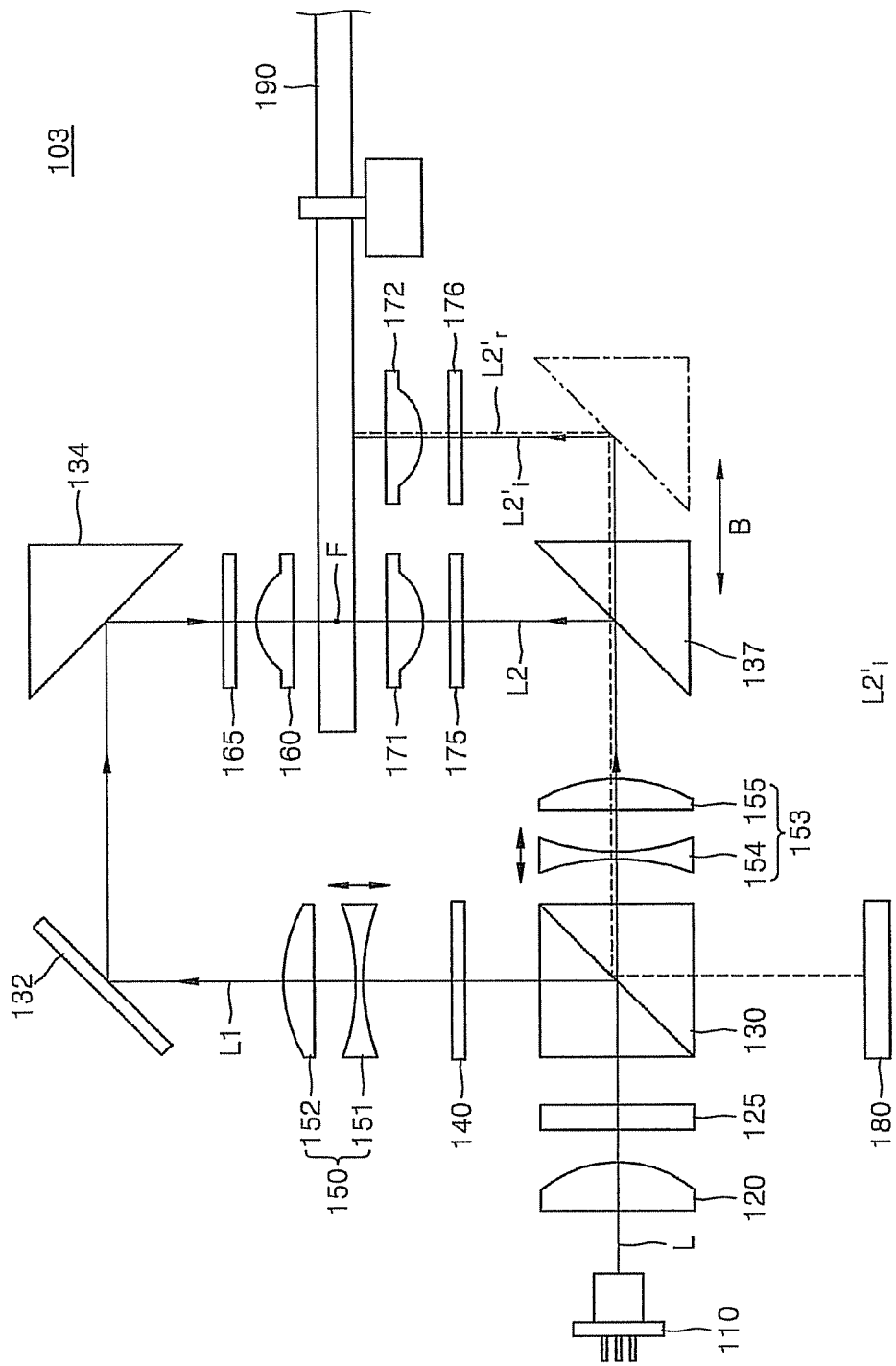
FIG. 11 is a schematic view of an apparatus for recording/reproducing holographic information according to an embodiment of the present invention.
Figure 12:
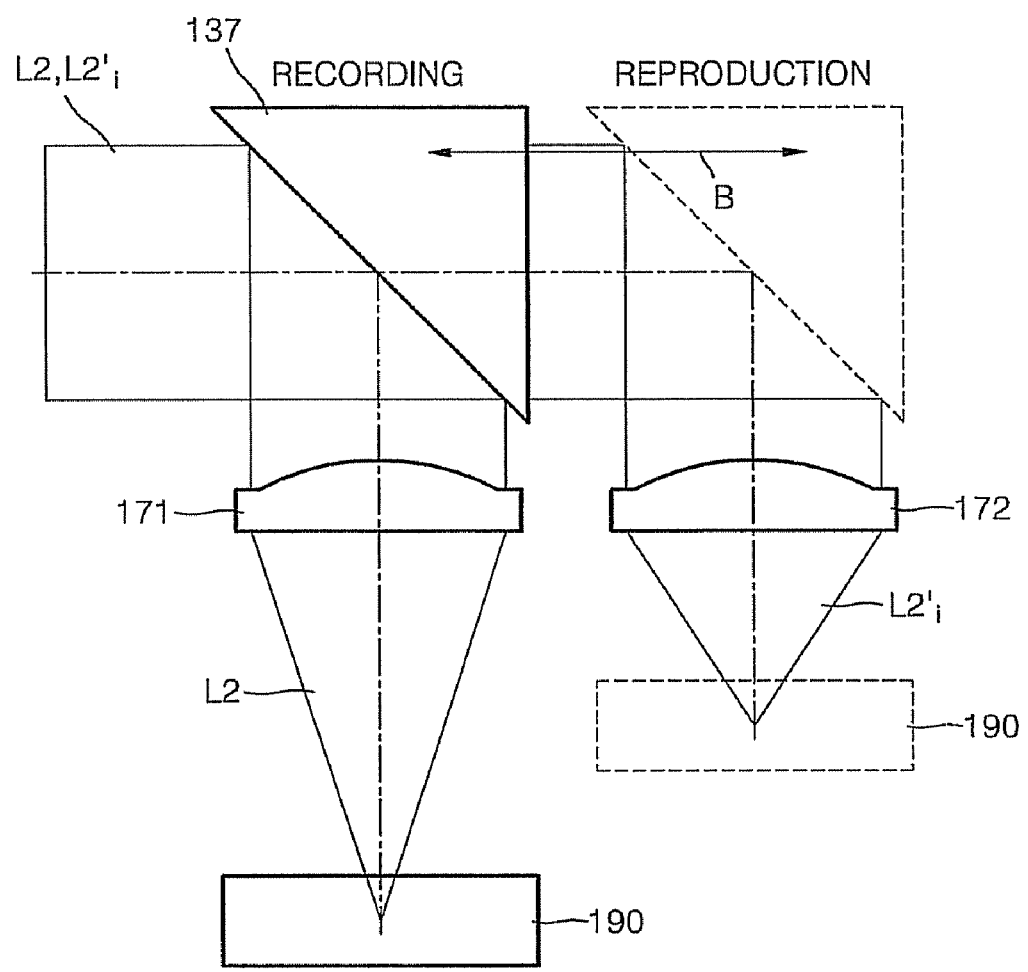
FIG. 12 illustrates the selective operation of a recording objective lens and a reproduction objective lens during recording and during reproduction, respectively, according to an aspect of the invention.

FIG. 11 is a schematic view of an apparatus for recording/reproducing holographic information according to an embodiment of the present invention, and FIG. 12 illustrates the selective operation of a recording objective lens and a reproduction objective lens during recording and during reproduction, respectively. Referring to FIGS. 11 and 12, the apparatus for recording/reproducing holographic information is an apparatus which records information on a holographic information storage medium 190 and reproduces recorded information. The other elements of the optical construction of the apparatus of FIG. 11, except for second objective lenses 171 and 172 which are units for adjusting the NA of a focusing optical system and a moving reflection member 137, are substantially the same as those of FIGS. 1 through 6. Like reference numerals in FIGS. 1 through 6 denote like elements and thus, a description thereof will be omitted here.

An optical pickup 103, according to the shown embodiment of the present invention, comprises the two second objective lenses 171 and 172 instead of the aperture-adjustment element 173 of FIG. 1, the beam expander 156 of FIG. 7 or the liquid crystal lens 174 of FIG. 9, so as to adjust the NAs of the second objective lenses 171 and 172. The two second objective lenses 171 and 172 may include the second objective lens 171 for recording and the second objective lens 172 for reproduction. In this case, the NA of the second objective lens 171 for recording is designed to be smaller than the NA of the second objective lens 172 for reproduction.

The moving reflection member 137 is a reflection member which moves during recording/reproduction and may be mechanically driven by an external power source. The second objective lens 171 for recording and the second objective lens 172 for reproduction are arranged in parallel. The moving reflection member 137 moves between the second objective lens 171 for recording and the second objective lens 172 for reproduction in a direction B, so as to, during recording, guide the optical path of reference light L2 toward the second objective lens 171 for recording and so as to, during reproduction, guide the optical path of reproduction light $L2'_i$ toward the second objective lens 172 for reproduction. In the present embodiment of the present invention, the second objective lenses 171 and 172 and the second quarter wave plates 175 and 176 are disposed for recording and for reproduction, respectively. However, the present invention is not limited to this. For example, the second quarter wave plates 175 and 176 may be disposed on the common optical path of the reference light L2 and the reproduction light $L2'_i$, or the second focus-adjustment unit 153 may be disposed for recording and for reproduction, respectively. The two second objective lenses 171 and 172 are separately disposed for recording and for reproduction, respectively. The NA of the second objective lens 171 for recording is made smaller than the NA of the second objective lens 172 for reproduction so that the diffraction efficiency of the recording mark M recorded in the holographic information storage medium 190, i.e., the diffraction efficiency of the hologram, is increased. Thus, an improvement in signal quality during reproduction can be expected.

Figure 13:
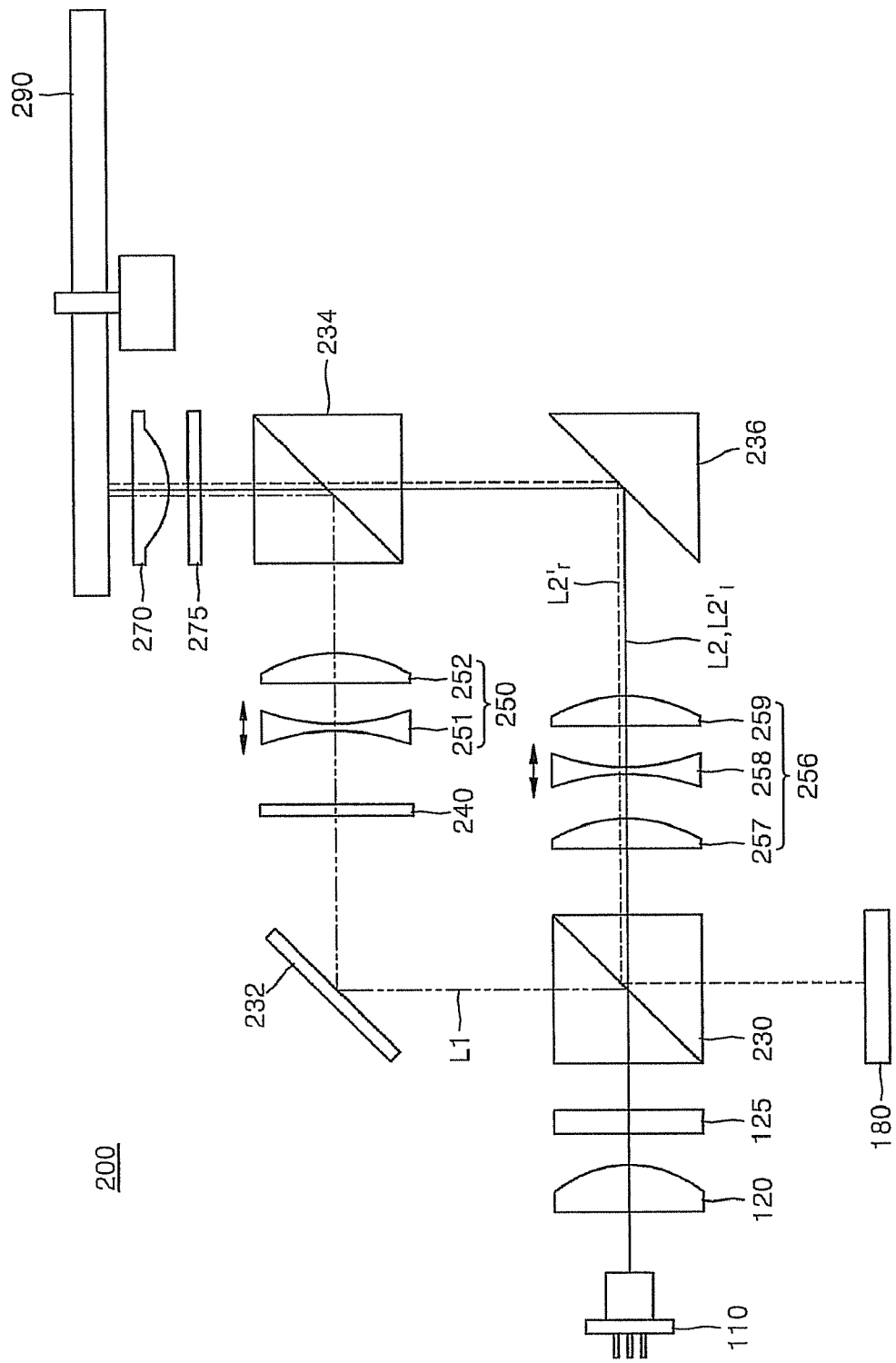
FIG. 13 is a schematic view of an apparatus for recording/reproducing holographic information according to an embodiment of the present invention.

FIG. 13 is a schematic view of an apparatus for recording/reproducing holographic information according to another embodiment of the present invention. Referring to FIG. 13, the apparatus for recording/reproducing holographic information is an apparatus which records information on a holographic information storage medium 290 and reproduces recorded information. The apparatus of FIG. 13 comprises an optical pickup 200 which irradiates light on the holographic information storage medium 290 and receives irradiated light, and a circuit unit (not shown).

The optical pickup 200 comprises a light source 110, a collimating lens 120, a polarization conversion element 125, first and second optical path division elements 230 and 234, first and second reflection members 232 and 236, a shutter 140, a focus controlling unit 250, a beam expander 256, a quarter wave plate 175, an objective lens 270, and a photodetector 180. The optical pickup 200 may further comprise a servo optical system (not shown) for performing a servo operation. Optical elements according to the present embodiment of the present invention, which are substantially the same as those of the apparatus of FIG. 1, denote like reference numerals, and a detailed description thereof will be omitted here.

The signal light L1 and the reference light L2, which are divided by the first optical path division element 230, are combined at the second optical path division element 234 via different optical paths. The first reflection member 232, the shutter 240, and the focus controlling unit 250 are disposed on the optical path of the signal light L1 between the first and second optical path division elements 230 and 234. The beam expander 256 and the second reflection member 236 are disposed on the optical path of the reference light L2 between the first and second optical path division elements 230 and 240.

During recording, the signal light L1 that is divided by the first optical path division element 230 is incident on the second optical path division element 234 via the first reflection member 232, the shutter 240, and the focus controlling unit 250. The reference light L2 that is divided by the first optical path division element 230 is incident on the second optical path division element 234 via the beam expander 256 and the second reflection member 236. Light that follows the optical path of the signal light L1, from among reproduction light divided by the first optical path division element 230 during reproduction, is intercepted by the shutter 240, and only light that follows the optical path of the reference light L2 from among reproduction light divided by the first optical path division element 230 is incident on the holographic information storage medium 290.

Figure 14A:
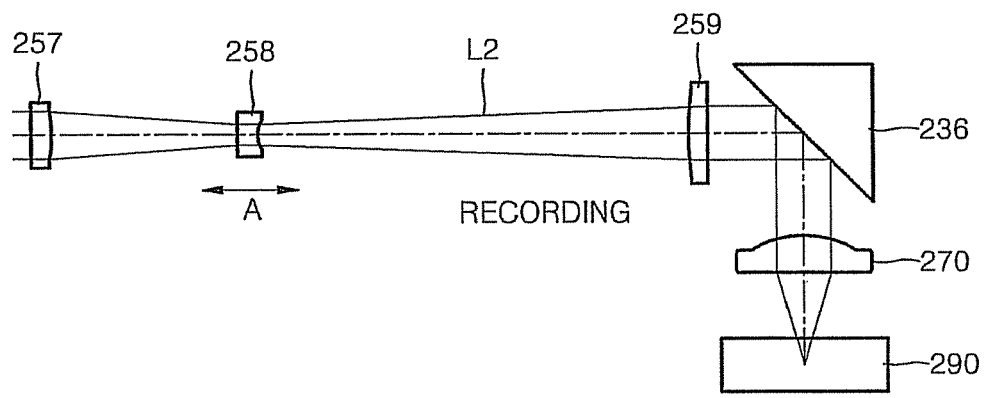
FIGS. 14A and 14B illustrate the operation of a beam expander during recording and during reproduction, respectively, according to an aspect of the invention.
Figure 14B:
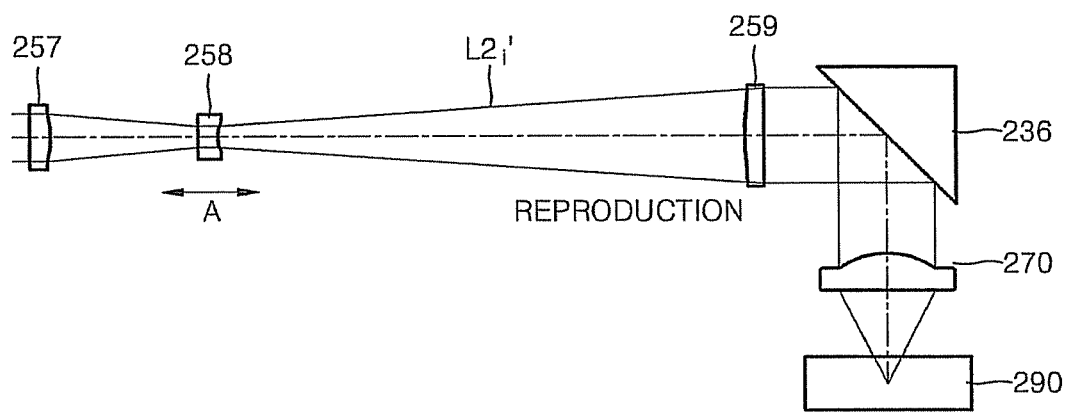

Referring to FIGS. 14A and 14B, the beam expander 256 comprises first through third relay lenses 257, 258, and 259. The beam expander 256 may adjust the diameter of light that passes the beam expander 256 by changing the position of the second relay lens 258 in a direction A. The beam expander 256 may make the diameter of light passing during recording smaller than the diameter of light passing during reproduction and may make the diameter of light passing during reproduction larger than the diameter of light passing during recording. As described above, when the diameter of light that is incident on the objective lens 270 is changed, the NA of the objective lens 270 is changed. In other words, the NA of the objective lens 270 during recording may be smaller than the NA of the objective lens 270 during reproduction. As such, the diffraction efficiency of the recording mark M is increased, and an improvement in signal quality during reproduction can be expected.

Figure 15A:
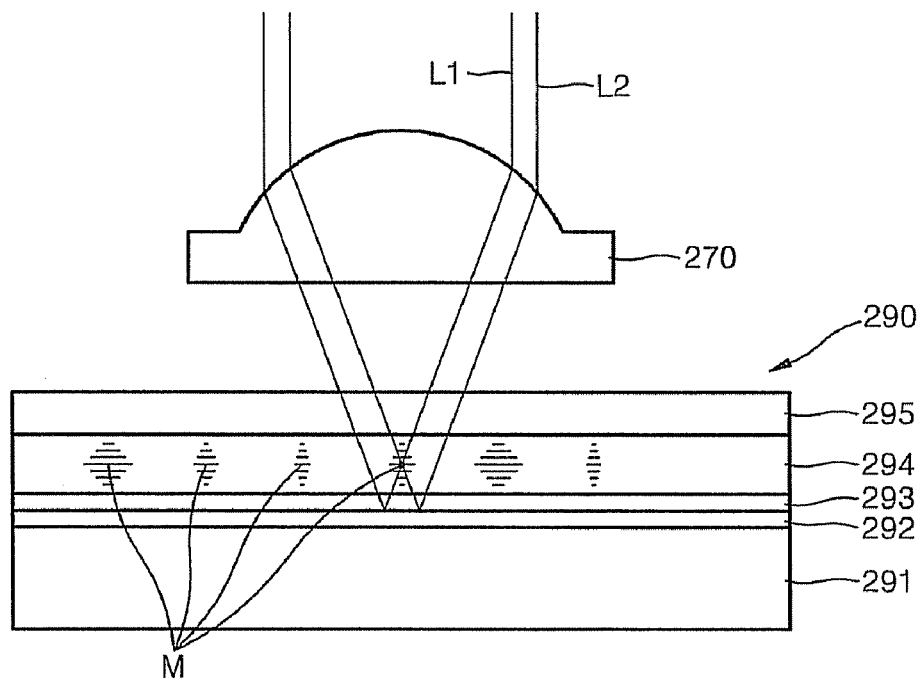
FIGS. 15A and 15B illustrate a case where a recording mark is formed on a holographic information storage medium used in the apparatus for recording/reproducing holographic information illustrated in FIG. 1 during recording and during reproduction, respectively, according to an aspect of the invention.
Figure 15B:
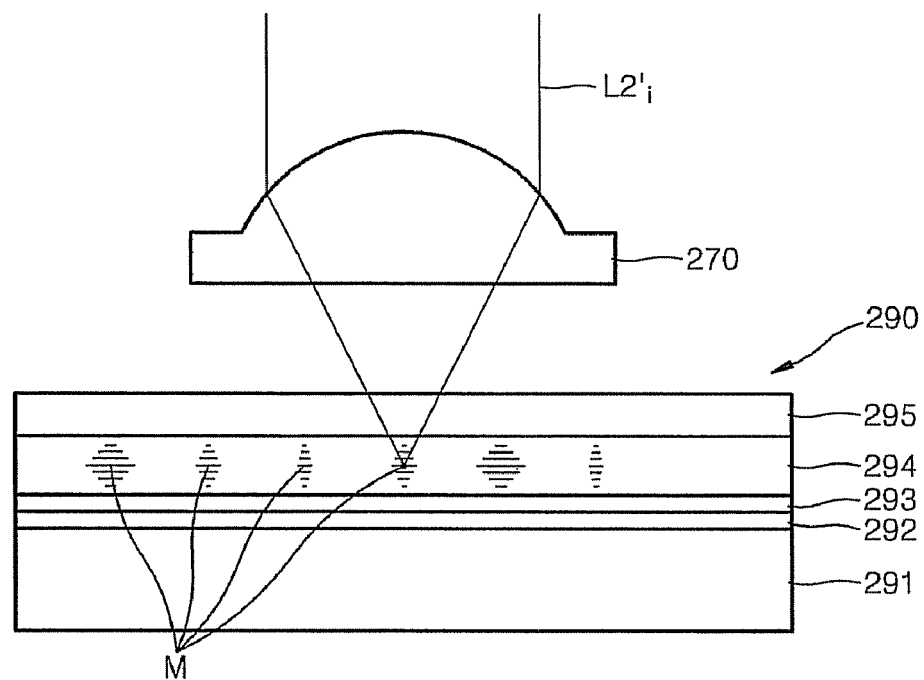

FIG. 15A illustrates the case where a recording mark M is formed on the holographic information storage medium 290 during recording and FIG. 15B illustrates the case where a recording mark M is read during reproduction. The holographic information storage medium 290, according to the shown embodiment of the present invention, is a one-sided irradiation type medium comprising a substrate 291, a reflection layer 292, a recording layer 294, and a cover layer 295, which are sequentially disposed on the substrate 291. A space layer 293 may be further disposed between the recording layer 294 and the reflection layer 292. The cover layer 295 is formed of a transparent medium, and signal light L1 and reference light L2 or reproduction light L2$'_i$ is incident on the cover layer 295. The space layer 293 is a layer for obtaining a distance between the reflection layer 292 and the focus of the signal light L1 that is reflected from the reflection layer 292.

During recording, the signal light L1 is directly focused on one point of the recording layer 294, and the reference light L2 is reflected from the reflection layer 292 and then is focused in the same position as a position in which the signal light L1 is focused. Interference patterns are formed at a position where the signal light L1 and the reference light L2 are focused, so that a hologram including single bit information, i.e., the recording mark M, can be formed. In the holographic information storage medium 290, according to the present embodiment of the present invention, the recording layer 294 is formed by using a photo reactive material having a threshold response. Thus, even though the NA of the objective lens 270 during recording is reduced, the size of the recording mark M may be formed to the diffraction limit of reproduction light L2$'_i$ irradiated during reproduction. The NA of the objective lens 270 during recording is set to be smaller than the NA of the objective lens 270 during reproduction so that the diffraction efficiency of the recording mark M can be increased. The NA of the objective lens 270 during reproduction may be set to be the same as the size of the recording mark M so that the recording mark M can be correctly read.

In the shown embodiment of the present invention, the beam expander 256 is disposed on the path of the reference light L2 so as to change the NA of the objective lens 270. However, the position of the focus controlling unit 250 disposed on the path of the signal light L1 and the position of the beam expander 256 disposed on the path of the reference light L2 may be changed. Furthermore, the beam expander 256 may also be disposed on the paths of both the signal light L1 and the reference light L2.

Figure 16:
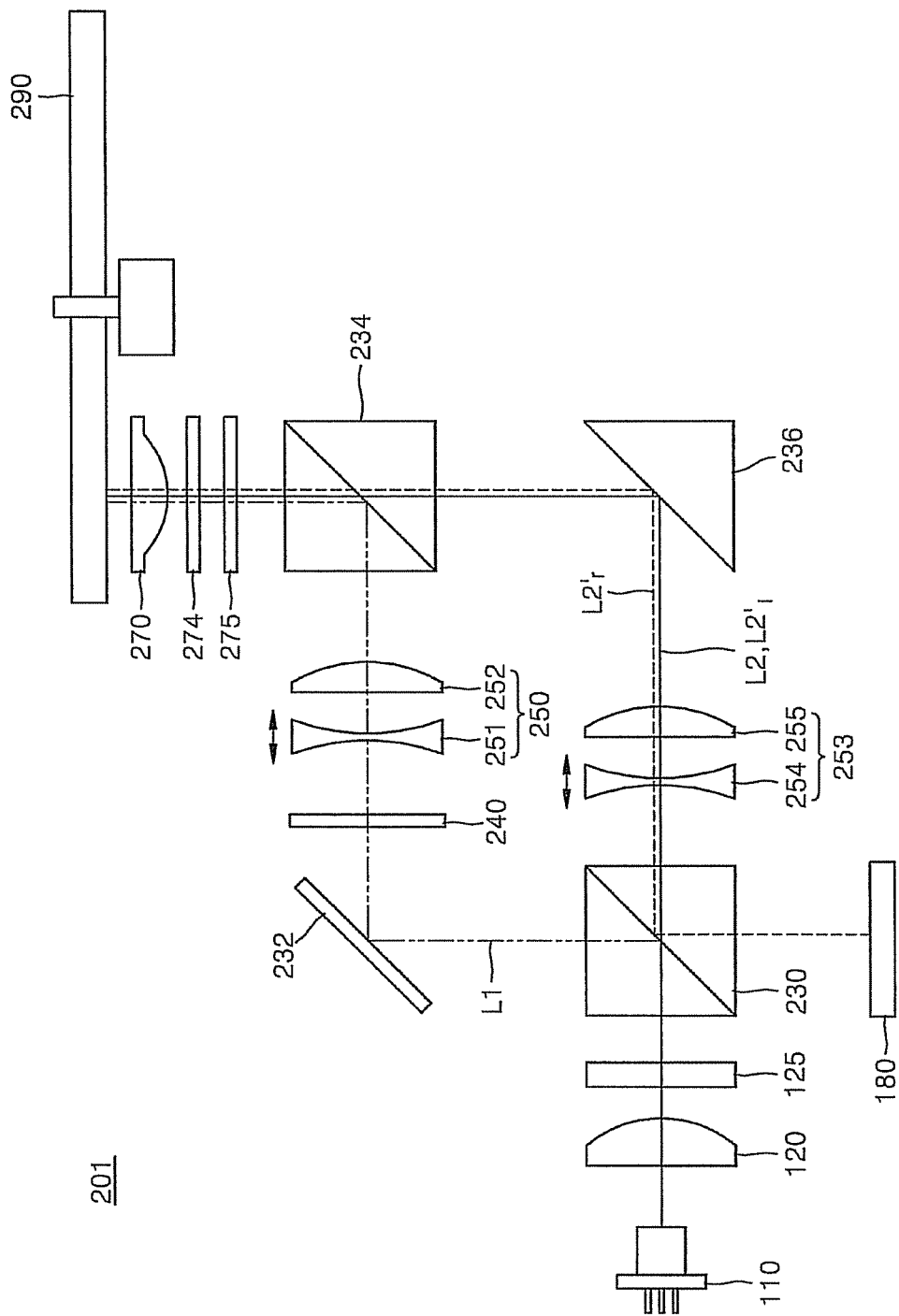
FIG. 16 is a schematic view of an apparatus for recording/reproducing holographic information according to an embodiment of the present invention.
Figure 17A:
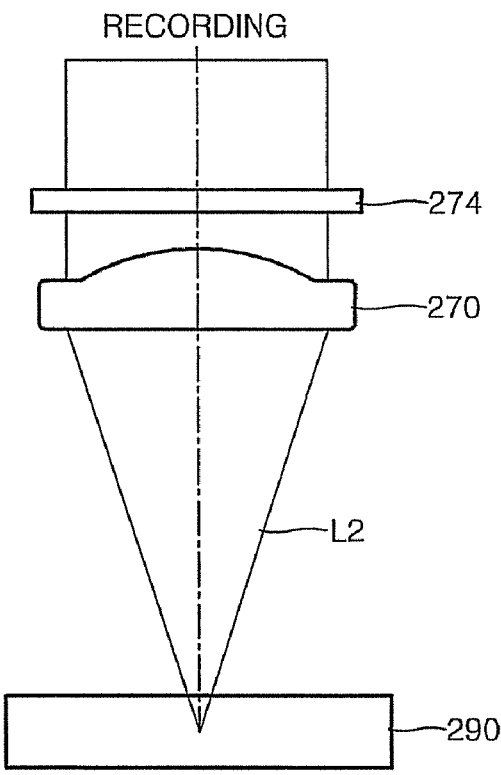
FIGS. 17A and 17B illustrate the operation of a liquid crystal lens during recording and during reproduction, respectively, according to an aspect of the invention.
Figure 17B:
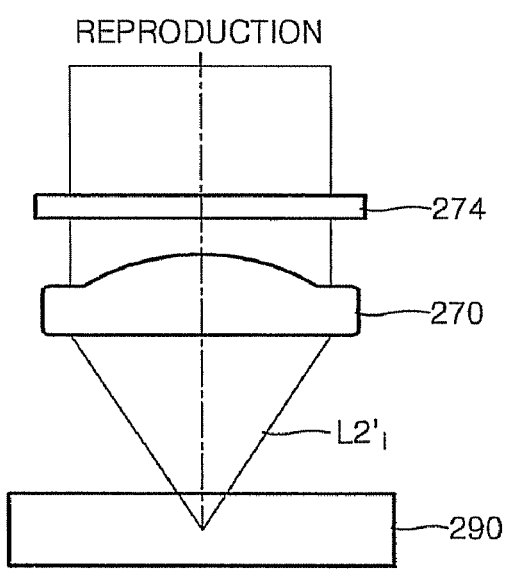

FIG. 16 is a schematic view of an apparatus for recording/reproducing holographic information according to an embodiment of the present invention, and FIGS. 17A and 17B illustrate the operation of a liquid crystal lens during recording and during reproduction, respectively. Referring to FIG. 16, the apparatus for recording/reproducing holographic information is an apparatus which records information on the holographic information storage medium 290 and reproduces recorded information. The other elements of the apparatus of FIG. 16, except for a liquid crystal lens 274 which is a unit for adjusting the NA of the focusing optical system, are substantially the same as that of the embodiment shown in FIGS. 13 through 15. Like reference numerals as those of FIGS. 13 and 15 denote like elements, and a detailed description thereof will be omitted here.

An optical pickup 201 according to the shown embodiment of the present invention adopts the liquid crystal lens 274 instead of a beam expander 256 of FIG. 13, so as to adjust the NA of the objective lens 270. The liquid crystal lens 274 may be adjacent to the objective lens 270 and may be interposed between the quarter wave plate 275 and the objective lens 270, for example. The refractive index of the liquid crystal lens 174 is changed according to externally applied voltages. Thus, the degree of convergence/divergence of light that is incident on the objective lens 270 via the liquid crystal lens 274 may be changed, and the diameter of light that is incident on the objective lens 270 may be changed. The NA of the objective lens 270 may be adjusted by the liquid crystal lens 274.

Referring to FIGS. 17A and 17B, the NA of the objective lens 270 during recording may be made smaller than the NA of the objective lens 270 during reproduction by using the liquid crystal lens 274. In this way, the NA of the objective lens 270 during recording is made smaller than the NA of the objective lens 270 during reproduction so that the recording mark M recorded in the holographic information storage medium 290 (i.e., the diffraction efficiency of the hologram), is increased, and an improvement in signal quality during reproduction can be expected.

In the shown embodiment of the present invention, the NA of the objective lens 270 is changed by using the liquid crystal lens 274. However, the present invention is not limited to the shown embodiment. For example, the NA of the objective lens 270 may be changed by adopting an aperture-adjustment element of FIG. 1 instead of the liquid crystal lens 274.

Figure 18:
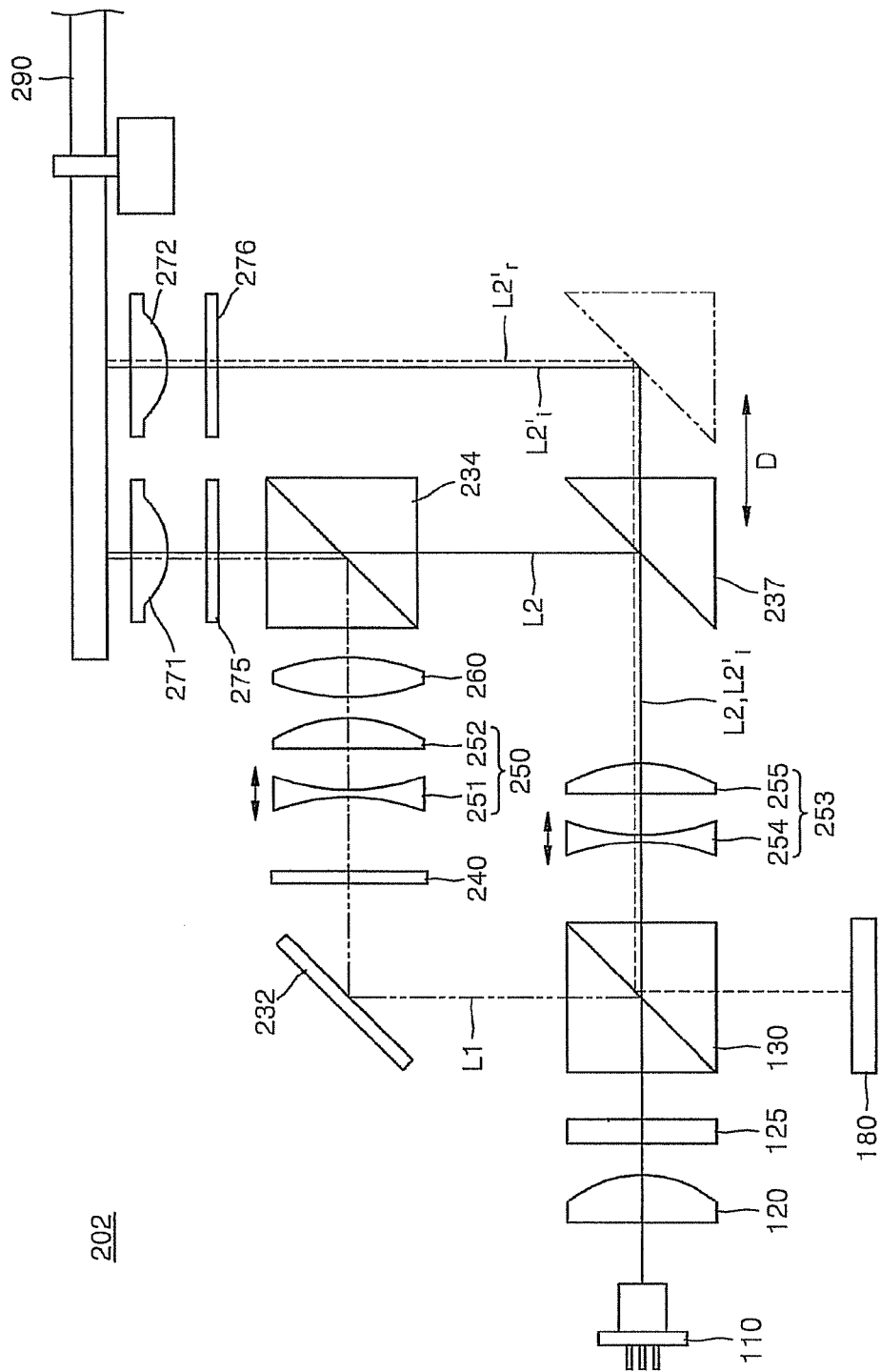
FIG. 18 is a schematic view of an apparatus for recording/reproducing holographic information according to an embodiment of the present invention.
Figure 19:
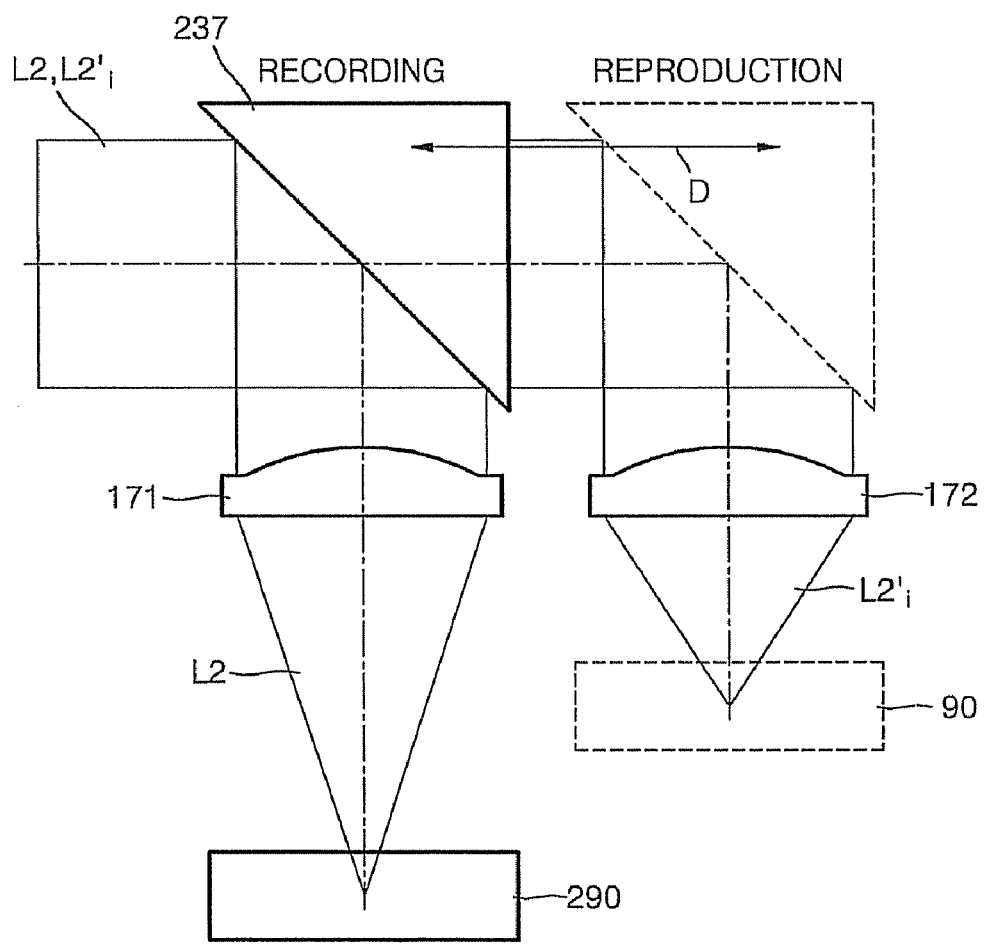
FIG. 19 illustrates the selective operation of a recording objective lens and a reproduction objective lens during recording and during reproduction, respectively, according to an aspect of the invention.

FIG. 18 is a schematic view of an apparatus for recording/reproducing holographic information according to an embodiment of the present invention, and FIG. 19 illustrates the operation of the apparatus of FIG. 18. Referring to FIGS. 18 and 19, the apparatus for recording/reproducing holographic information is an apparatus which records information on a holographic information storage medium 290 and reproduces recorded information. The other elements of the optical construction of the apparatus of FIG. 18 except for objective lenses 271 and 272, which are units for adjusting the NA of a focusing optical system and a moving reflection member 237, are substantially the same as those of FIGS. 13 through 15. Like reference numerals in FIGS. 13 through 15 denote like elements and thus, a description thereof will be omitted here.

An optical pickup 202, according to the present embodiment of the present invention, comprises the two objective lenses 271 and 272 instead of the beam expander 256 of FIG. 13 or the liquid crystal lens 274 of FIG. 16, so as to adjust the numerical apertures (NA) of the objective lenses 271 and 272. The two objective lenses 271 and 272 may include the objective lens 271 for recording and the second objective lens 272 for reproduction. In this case, the NA of the objective lens 271 for recording is designed to be smaller than the NA of the objective lens 272 for reproduction.

The moving reflection member 237 is a reflection member which moves during recording/reproduction and may be mechanically driven by an external power source. The objective lens 271 for recording and the objective lens 272 for reproduction are arranged in parallel. The moving reflection member 237 moves between the objective lens 271 for recording and the objective lens 272 for reproduction in a direction D for two purposes. First, during recording, the moving reflection member 237 guides the optical path of reference light L2 toward the objective lens 271 for recording. Second, during reproduction, the moving reflection member 237 guides the optical path of reproduction light L2'$_r$ toward the objective lens 272 for reproduction. In the shown embodiment of the present invention, the objective lenses 271 and 272 and the quarter wave plates 275 and 276 are disposed for recording and for reproduction, respectively. However, the invention is not limited to the shown embodiment. For example, the quarter wave plates 275 and 276 may be disposed on the common optical path of the reference light L2 and the reproduction light L2'$_r$. In the present embodiment of the present invention, the two objective lenses 271 and 272 are separately disposed for recording and for reproduction, respectively, and the NA of the second objective lens 271 for recording is made smaller than the NA of the objective lens 272 for reproduction so that the diffraction efficiency of the recording mark M recorded in the holographic information storage medium 290, i.e., the diffraction efficiency of the hologram, is increased, and an improvement in signal quality during reproduction can be expected.

In the embodiments described above, the aperture-adjustment element, the beam expander, or the liquid crystal lens can be adopted, or separate objective lenses having different NAs can be selectively adopted, so as to have different NAs of an optical pickup focusing optical system during recording and during reproduction, respectively. Moreover, it is understood that the operations of the apparatuses can be controlled by a processor and/or computer implementing a method encoded on a computer readable medium. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for recording and reproducing holographic information, comprising an optical pickup which irradiates light on a holographic information storage medium and receives irradiated light,
wherein the optical pickup comprises a focusing optical system having a reference light path with a numerical aperture (NA) during recording, and a reproduction light with an NA during reproduction, and
wherein the NA during recording is lower than the NA during reproduction.

2. The apparatus of claim 1, wherein the focusing optical system satisfies the following equation when the NA during recording is $NA_1$ and the NA during reproduction comprises $NA_2$:

$$1/4 \leq NA_1/NA_2 < 1.$$

3. The apparatus of claim 1, wherein the focusing optical system, comprises:
an objective lens; and
an aperture-adjustment element which changes a size of an aperture so as to adjust a diameter of the irradiated light that is incident on the objective lens.

4. The apparatus of claim 1, wherein the focusing optical system comprises:
an objective lens; and
a beam expander which adjusts a magnification of light so as to adjust a diameter of the irradiated light that is incident on the objective lens.

5. The apparatus of claim 1, wherein the focusing optical system comprises:
an objective lens; and
an active liquid crystal element which is activated to adjust a diameter of the irradiated light on the objective lens.

6. The apparatus of claim 1, wherein the focusing optical system comprises:
a first optical member for recording having an NA for recording; and
a second optical member for reproduction, having an NA larger than the NA of the optical member for recording,
wherein the optical member for recording and the optical member for reproduction are selectively used during recording and during reproduction.

7. The apparatus of claim 6, wherein the focusing optical system further comprises an optical path conversion member which guides an optical path of a reference light during recording toward the optical member for recording and guides an optical path of the reference light during reproduction toward the optical member for reproduction.

8. The apparatus of claim 6, wherein the optical member for recording comprises an objective lens for recording, and the optical member for reproduction comprises an objective lens for reproduction.

9. The apparatus of claim 1, wherein a recording layer of the holographic information storage medium comprises a photo reactive material having a threshold response, and intensities of a signal light and a reference light that are irradiated during recording have larger values than threshold values of the photo reactive material in the center of spots of the signal light and the reference light.

10. The apparatus of claim 1, wherein the optical pickup comprises a first focusing optical system and a second focusing optical system that irradiate a signal light and a reference light on corresponding sides of the holographic information storage medium during recording.

11. The apparatus of claim 10, wherein an NA of the second focusing optical system during recording is lower than an NA of the second focusing optical system during reproduction.

12. The apparatus of claim 1, wherein the optical pickup irradiates signal light and reference light on a cross-section of the holographic information storage medium during recording.

13. The apparatus of claim 1, further comprising a first focus controlling unit and a second focus controlling unit that control a depth of focus of each of a signal light and a reference light irradiated on the holographic information storage medium, wherein the first focus controlling unit and the second focus controlling units record information in a multi-layer structure.

14. The apparatus of claim 1, wherein single bit information is recorded in an interference pattern shape.

15. A method of recording and reproducing holographic information, comprising:
    recording information on a holographic information storage medium using a focusing optical system having a reference light path having a numerical aperture (NA) during recording; and
    reading information from the holographic information storage medium using the focusing optical system having a reproduction light path having an NA during reproduction,
    wherein the NA during reproduction is higher than the NA during recording.

16. The method of claim 15, wherein the focusing optical system satisfies the following equation when the NA during recording is NA1 and the NA during reproduction is NA2:

$$\tfrac{1}{4} \leq NA_1/NA_2 < 1.$$

17. The method of claim 15, wherein the NA of the focusing optical system is adjusted by adjusting a diameter of light that is incident on an objective lens of the focusing optical system.

18. The method of claim 15, wherein the focusing optical system comprises:
    an optical member for recording, having a first NA; and
    an optical member for reproduction, having second NA that is higher than the first NA,
    wherein, during recording, information is recorded by using the optical member for recording, and during reproduction, information is read by using the optical member for reproduction.

19. The method of claim 15, wherein information is recorded on the holographic information storage medium having a recording layer formed of a photo reactive material having a threshold response, and the recorded information is read.

20. The method of claim 15, wherein information is recorded in a multi-layer structure within the recording layer of the holographic information storage medium.

21. The method of claim 15, wherein single bit information is recorded in the recording layer of the holographic information storage medium.

* * * * *